(12) United States Patent  
Moor et al.

(10) Patent No.: US 8,332,385 B2  
(45) Date of Patent: Dec. 11, 2012

(54) APPROXIMATING QUERY RESULTS BY RELATIONS OVER TYPES FOR ERROR DETECTION AND OPTIMIZATION

(75) Inventors: Oege de Moor, Oxford (GB); Damien Sereni, Oxford (GB); Pavel Avgustinov, Oxford (GB); Mathieu Verbaere, Oxford (GB); Max Schaefer, Oxford (GB)

(73) Assignee: Semmle Limited, Oxford (GB)

( * ) Notice: Subject to any disclaimer, the term of this patent is extended or adjusted under 35 U.S.C. 154(b) by 945 days.

(21) Appl. No.: 12/402,046

(22) Filed: Mar. 11, 2009

(65) Prior Publication Data

US 2009/0234801 A1    Sep. 17, 2009

Related U.S. Application Data

(60) Provisional application No. 61/035,404, filed on Mar. 11, 2008.

(51) Int. Cl.
*G06F 7/00* (2006.01)
*G06F 17/30* (2006.01)

(52) U.S. Cl. ........................................ 707/713

(58) Field of Classification Search ............... 707/713, 707/999.002
See application file for complete search history.

(56) References Cited

U.S. PATENT DOCUMENTS

| 6,338,055 B1* | 1/2002 | Hagmann et al. ............ 1/1 |
| 2002/0069193 A1* | 6/2002 | Beavin et al. ............ 707/2 |
| 2002/0174207 A1 | 11/2002 | Battou | |

* cited by examiner

*Primary Examiner* — Aleksandr Kerzhner
(74) *Attorney, Agent, or Firm* — Fleit Gibbons Gutman Bongini & Bianco PL; Jon A. Gibbons

(57) ABSTRACT

A method and system is provided for computing an approximation of the results of a query. The approximation represents a superset of all possible results, by computing a set of records of types (as opposed to a set of records of values, which is the normal result of a query). This is different from conventional systems, which typically infer types for each field individually. For each record of types, one may also keep track of equalities of fields to improve the precision of the approximation. The approximation can be used to detect erroneous parts of queries that always return an empty result, regardless of the contents of the data source. Furthermore, the same approximation is also useful in performing optimizations: first, by eliminating parts of procedure calls that are guaranteed to be irrelevant to the calling context, and second, by eliminating unnecessary type tests in the query.

31 Claims, 29 Drawing Sheets

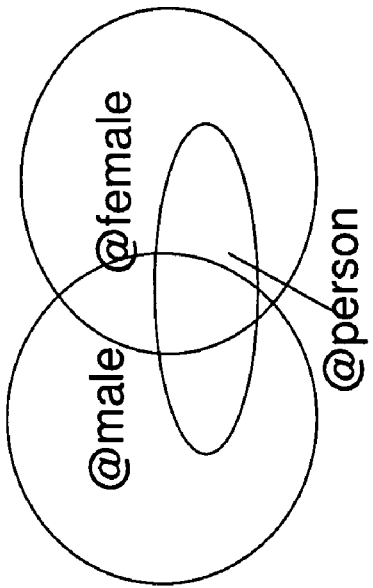
0904: @person ⇒ @male ∨ @female
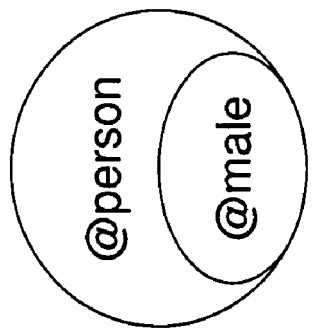
0902: @male ⇒ @person
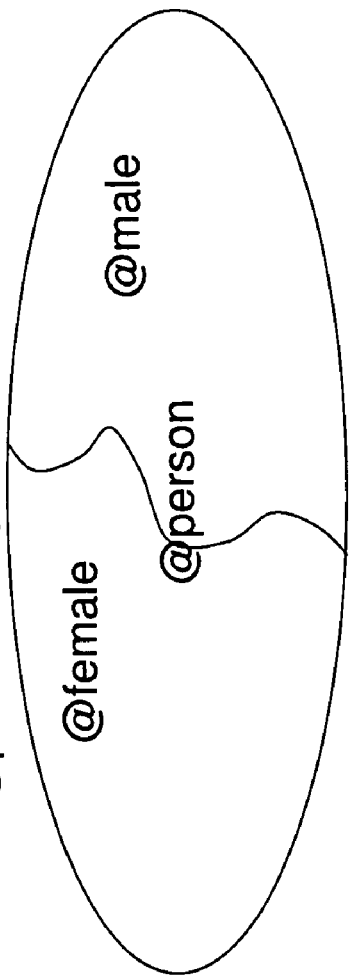
0906: Conjunction of:
@male ⇒ @person
@female ⇒ @person
¬(@male ∧ @female)
@person ⇒ @male ∨ @female
FIG. 9

1002: partition as a set of sets → {{1,2}, {3,6,9}, {4,5,7,10}, {8,12}, {11}, {13,15,16}, {14}}

1004: graphical representation of the partition →

Logical formula: $(A \wedge B) \vee (C \wedge D)$
Numbering 1: A, B, C, D
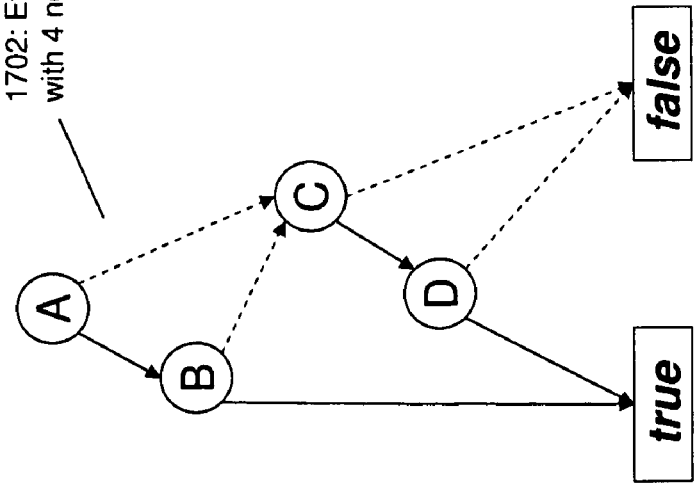
1702: Efficient BDD with 4 nodes
Numbering 2: A, C, B, D
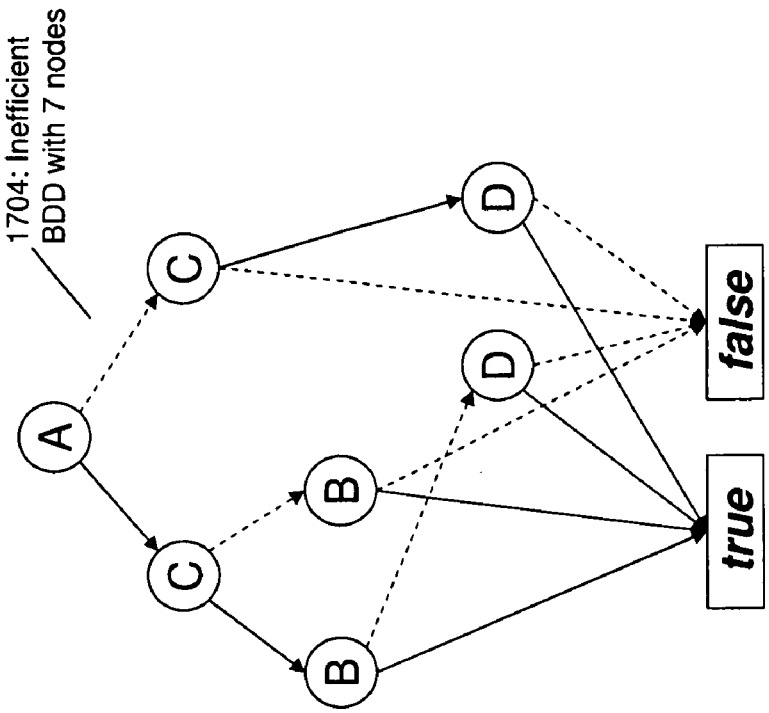
1704: Inefficient BDD with 7 nodes
FIG. 17

APPROXIMATING QUERY RESULTS BY RELATIONS OVER TYPES FOR ERROR DETECTION AND OPTIMIZATION

CROSS-REFERENCE TO RELATED APPLICATIONS

This application is based upon and claims priority from prior provisional patent application No. 61/035,404, filed on Mar. 11, 2008 the entire disclosure of which is herein incorporated by reference.

FIELD OF THE INVENTION

The present invention relates generally to information retrieval, and in particular the way electronically stored data is accessed via queries that are formulated in a programming language.

BACKGROUND OF THE INVENTION

A query is a computer program for retrieving particular items of electronically stored data. Like any other programming task, writing queries is error-prone, and it is helpful if the programming language in which queries are expressed gives assistance in identifying errors while queries are being written, and before they are executed on a relational data source. Programming languages often provide "types" for that purpose, indicating for each variable what kind of value it may hold. A programming language for expressing queries is usually called a "query language". The most popular example of a query language is the Structured Query Language (SQL).

In SQL, and in most other conventional query languages, types are assigned to each variable separately. As a consequence, only some categories of errors are caught before the query is executed on a relational data source. The only kind of error found is when an operation does not make sense: for instance, a string cannot be subtracted from an integer. In particular, one cannot predict accurately (without running the query) whether a query will return any results or not, and yet, a query that does not return any results is the most common symptom of a programming error.

In the logic programming community, type checkers that detect queries where there are no results regardless of the contents of the relational data source being queried have been constructed. However, most conventional type checkers do not precisely track the dependencies between variables. Also, in the theoretical database community, there has been some work on proving containment between queries, but this is typically restricted to small fragments of the query language which are of theoretical interest only. Furthermore these works do not take advantage of the type hierarchies that typically exist on data stored in a database.

SUMMARY OF THE INVENTION

In one embodiment, a computer-implemented method for approximating any results returned by a query over a relational data source is disclosed. The computer implemented method comprises receiving, at a computer system, a set of types and a schema. The schema describes a relational data source to be searched. The computer system produces at least one approximation of at least one result returned by a query. The query includes calls to other query procedures. The approximation includes at least one of a set of records of types and a set of records of Boolean formulas over types. Each field in the result occurs as a field in a record of types, and each type assigned to a field represents a superset of the set of values that are storable in that field. The computer system performs an optimization by transforming the other query procedures using the approximation by eliminating query parts that return an empty set of results regardless of the contents of the relational data source in a context where the query parts are called.

In another embodiment, a system for approximating any results returned by a query over a relational data source is disclosed. The system comprises a memory and a processor communicatively coupled to the memory. The system also comprises a compiler communicatively coupled to the memory and processor. The compiler is adapted to receive a set of types and a schema. The schema describes a relational data source to be searched. At least one approximation of at least one result returned by a query is produced. The query includes calls to other query procedures. The approximation includes at least one of a set of records of types and a set of records of Boolean formulas over types. Each field in the result occurs as a field in a record of types, and each type assigned to a field represents a superset of the set of values that are storable in that field. An optimization is performed by transforming the other query procedures using the approximation by eliminating query parts that return an empty set of results regardless of the contents of the relational data source in a context where the query parts are called.

In yet another embodiment, a computer program product for approximating any results returned by a query over a relational data source is disclosed. The computer program product comprises instructions for receiving a set of types and a schema. The schema describes a relational data source to be searched. At least one approximation of at least one result returned by a query is produced. The query includes calls to other query procedures. The approximation includes at least one of a set of records of types and a set of records of Boolean formulas over types. Each field in the result occurs as a field in a record of types, and each type assigned to a field represents a superset of the set of values that are storable in that field. An optimization is performed by transforming the other query procedures using the approximation by eliminating query parts that return an empty set of results regardless of the contents of the relational data source in a context where the query parts are called The various embodiments of the present invention compute an approximation of the results of a query over a relational data source (i.e. data stored in tables, for instance in a relational database). The approximation represents a superset of all possible results, and is obtained by computing a set of records of types (as opposed to a set of records of values, which is the normal result of a query). This is a radical departure from conventional systems, which typically infers types for each field individually, thus losing information about dependencies between types of fields. For each record of types, one may also keep track of equalities of fields, to improve the precision of the approximation. The approximation can be used to detect erroneous parts of queries that always return an empty result, regardless of the contents of the data source.

Furthermore, the same approximation is also useful in performing optimizations: first, by eliminating parts of subqueries of a query that are guaranteed to be irrelevant to the aforementioned query, and second, by eliminating unnecessary type tests in the query. For example, an effective method of checking that a query part P is empty is provided. Whenever this is the case, there is no need to execute P. In addition, whenever the method proves that a query part P implies that X has type T, then in a query "P and T(X)" the type test "T(X)" does not need to be performed.

In one embodiment, errors in queries are detected, and their efficient execution is ensured. For example, queries that return no results regardless of the contents of the relational data source are detected, signalling such a programming error. Therefore the various embodiments of the present invention are advantageous over conventional systems since there are many queries for which they prove that no results are returned, where earlier type checkers do not find these errors. This is a substantial improvement for users, as it is confusing that some errors of this kind are caught, and others are not.

The foregoing and other features and advantages of the various embodiments of the present invention will be apparent from the following more particular descriptions of the various embodiments of the present invention, as illustrated in the accompanying drawings.

BRIEF DESCRIPTION OF THE DRAWINGS

FIG. 9 shows the relationships between types that are implied by a set of type facts according to one embodiment of the present invention;

FIG. 17 depicts the importance of variable ordering for binary decision diagrams according to one embodiment of the present invention;

DETAILED DESCRIPTION

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Throughout the following discussion, a record is a mapping from a set of fields to a set of values. A relational data source is any entity that provides relational data (i.e., sets of records). A data source can, for example, be a relational database, but it could also be a web service or a file on a hard disk as well. A person or system that writes queries is referred to as the creator of a query.

Overview of the Various Embodiments of the Present Invention

Example operational hierarchies of at least some of the embodiments of the present invention are shown in FIGS. 21A-21I. FIGS. 21A-21I illustrate an overview of various embodiments of the present invention, showing various components and their relation to other figures. In particular, FIGS. 21A-21I show various operational hierarchies for approximating queries over a relational data source (in the following referred to as "relational queries") for the purposes of optimization and error checking. The concepts introduced by FIGS. 21A-21I are further explained (with many concrete examples) afterwards.

Figure 21A:
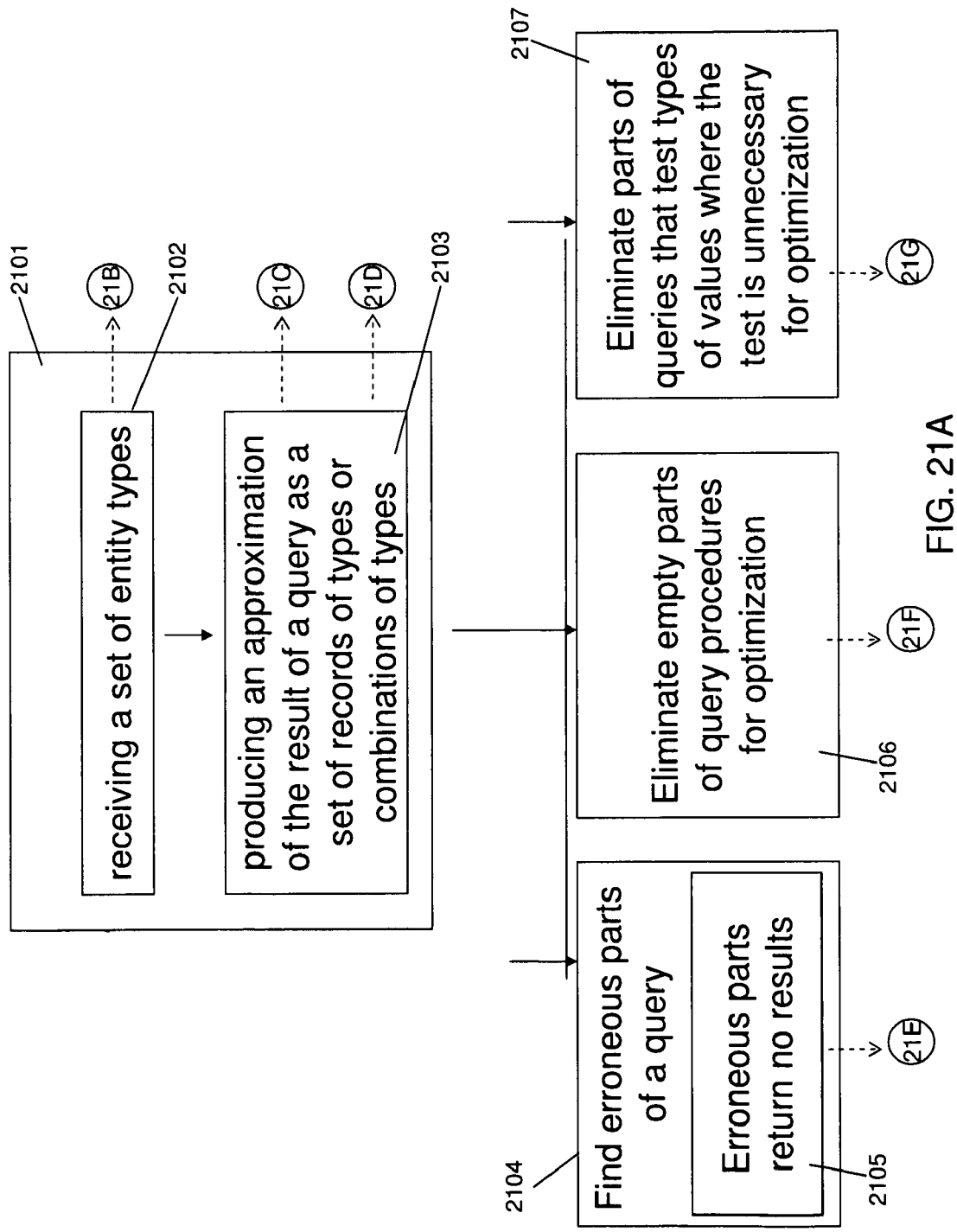
FIGS. 21A-21I are block diagrams giving an overview of the various components of the various embodiments of the present invention, where solid arrows indicate the flow between components and dashed arrows indicate additional levels of detail for these components.

In the example of FIG. 21A, the compiler 0106 (FIG. 1), at block 2101, approximates the possible results of a query 104 (FIG. 1) based on a set of entity types that are received at block 2102. In one embodiment, the approximation, at block 2103, takes the general form of a set of records of types or combinations of types. The compiler 0106, at block 2104, uses the approximation to identify erroneous parts of a query 0104. For example, the compiler 0106, at block 2105, identifies erroneous parts of a query 0104 that can never return a result. Alternatively or in addition to identifying erroneous parts of a query 104, the compiler 0106, at block 2106, also eliminates empty parts of query procedures for optimization. Even further, the complier 106, at block 2107, can also eliminate parts of queries 106 that test types of values where the test is unnecessary. The process of approximating the result of a query 0104 and the possible uses of this approximation (e.g., blocks 2104, 2106, 2107) are discussed in greater detail below and are further illustrated in FIG. 2 (block 2101), FIG. 3 (block 2104), and FIG. 4 (blocks 2106 and 2107)

Figure 21B:
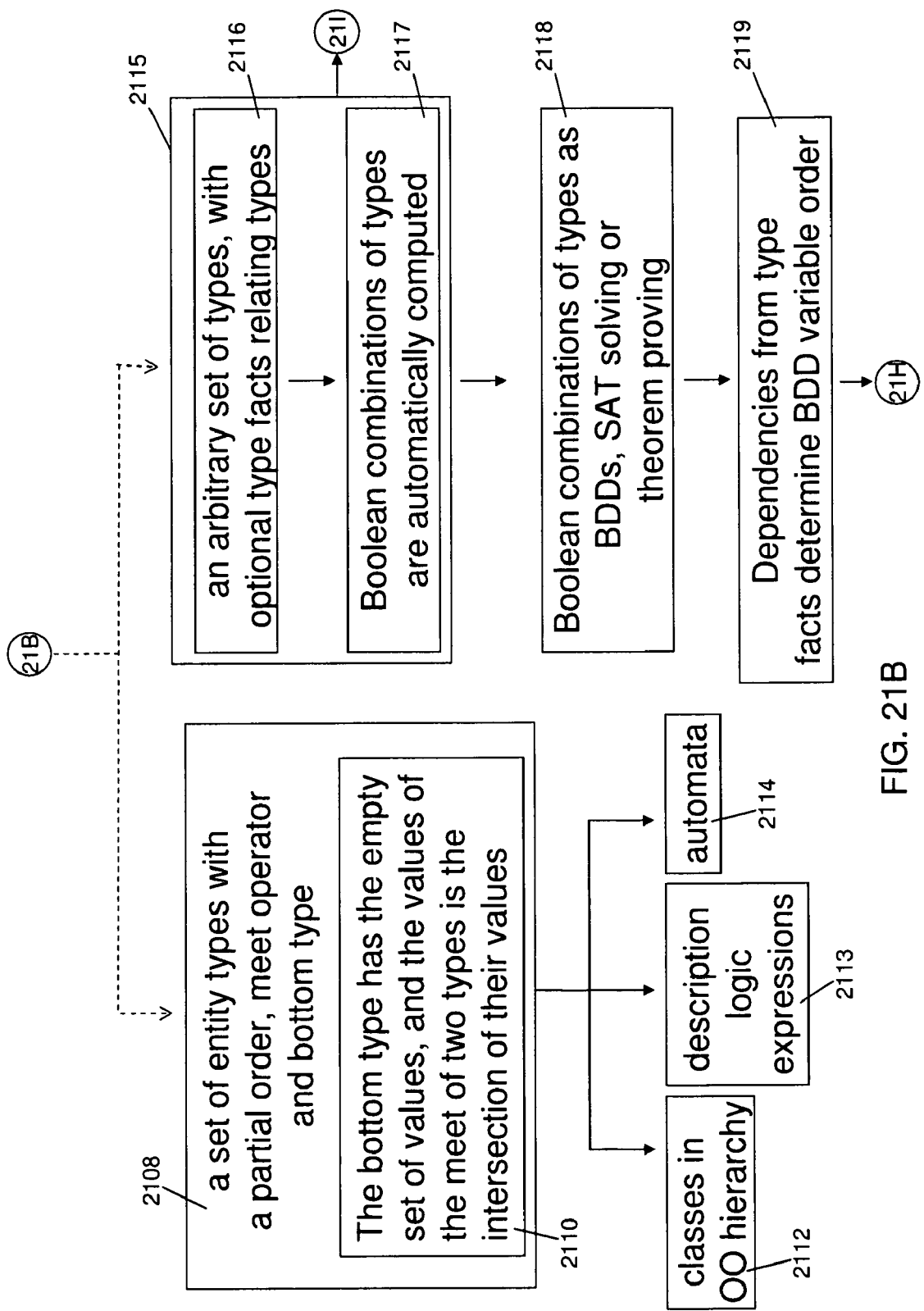
Figure 21C:
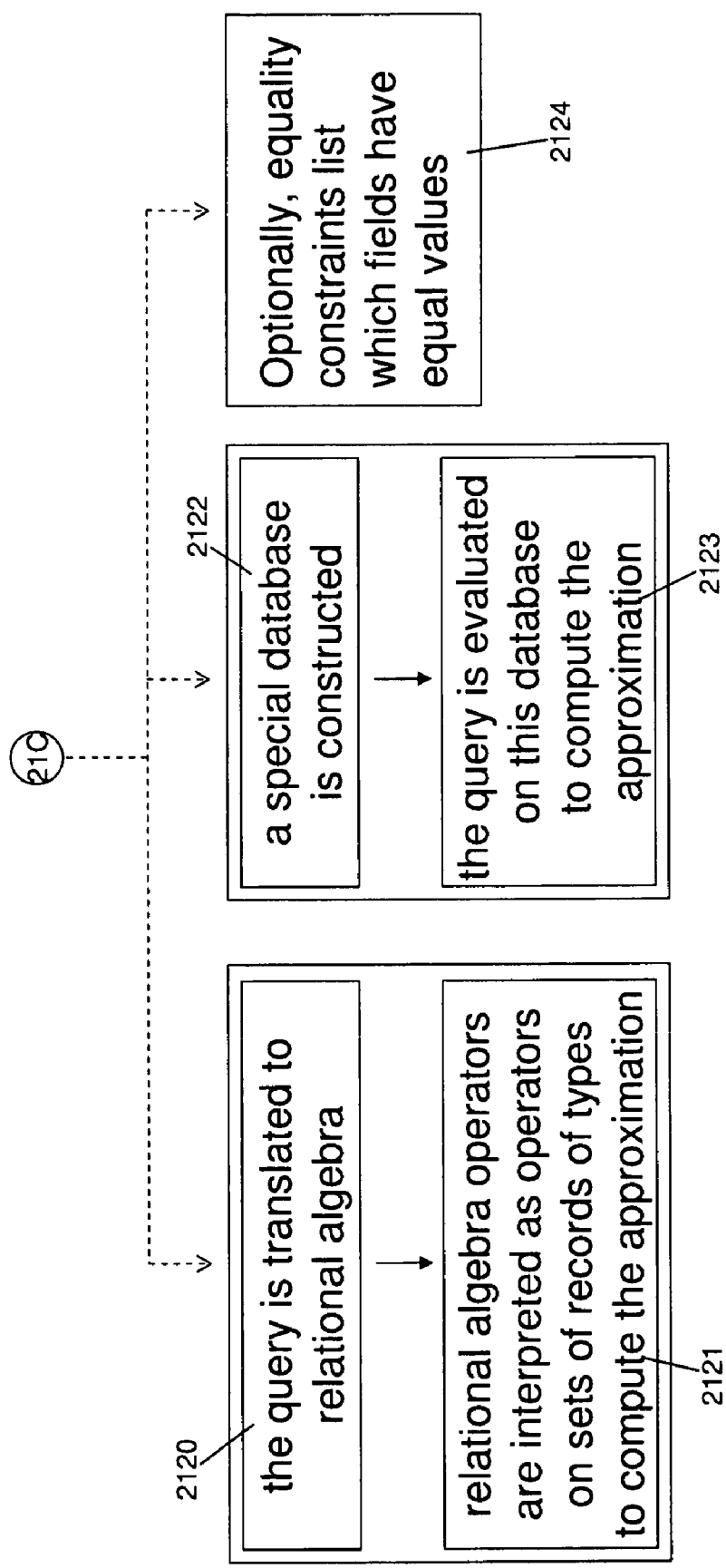
Figure 21D:
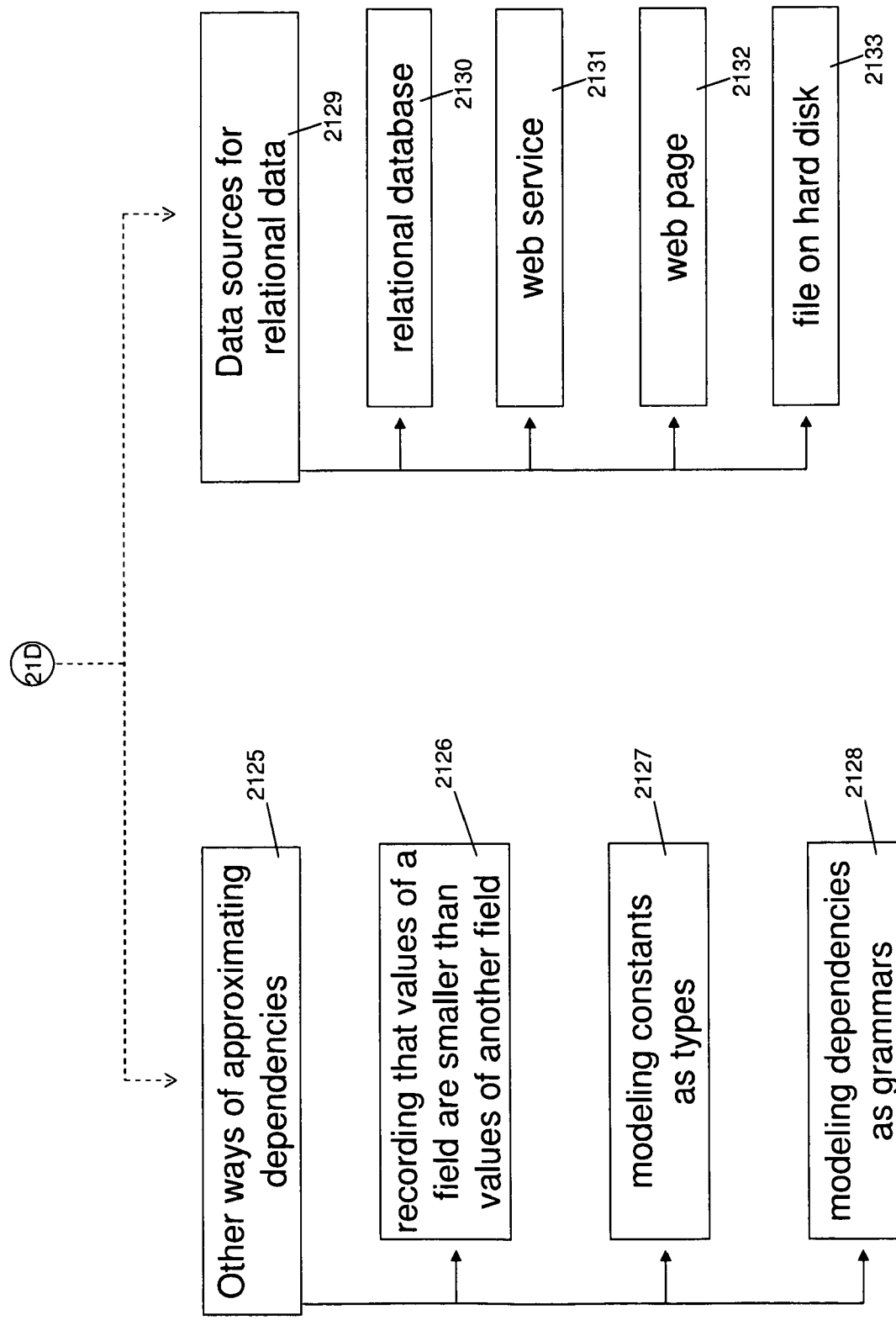
Figure 21E:
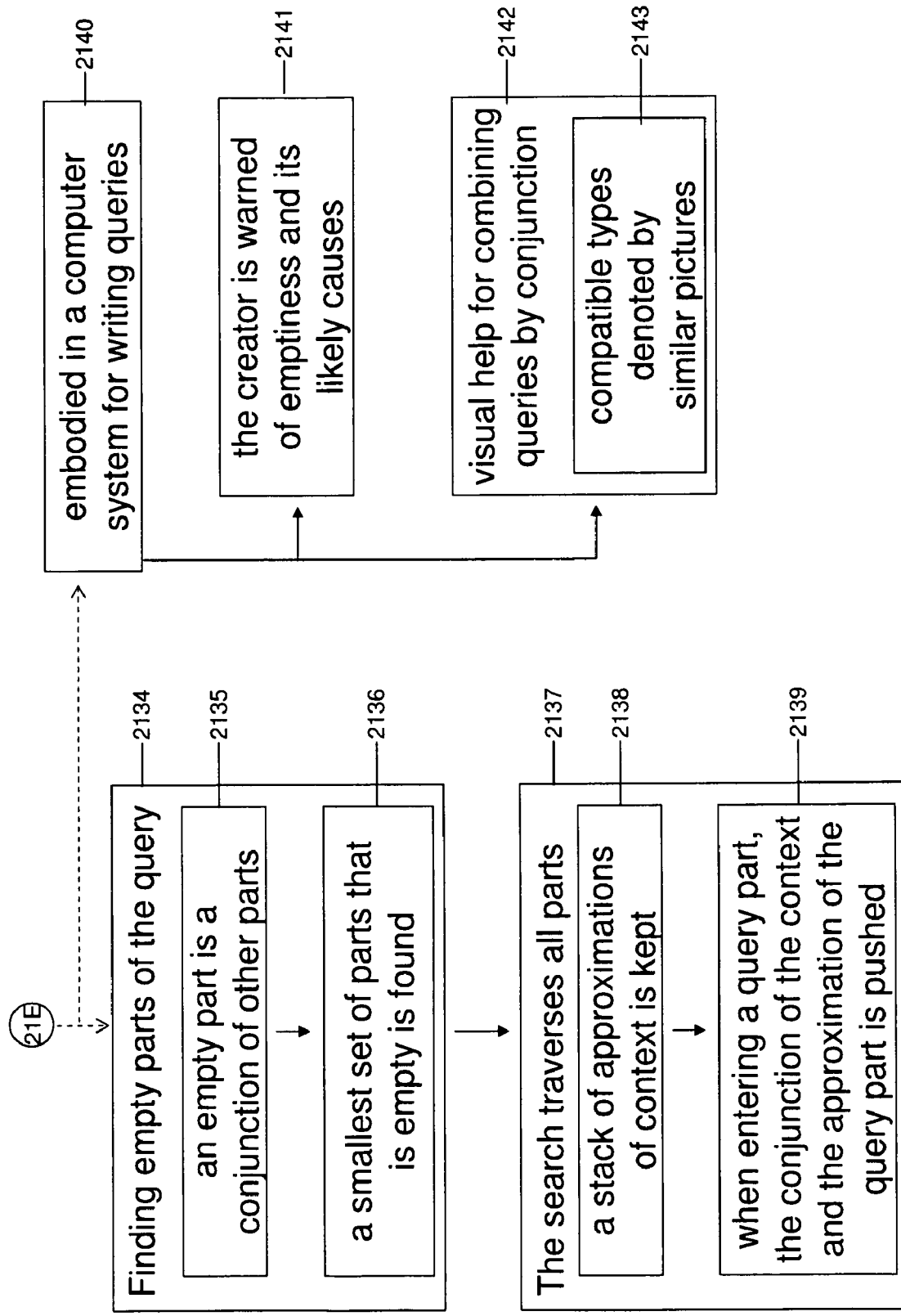
Figure 21F:
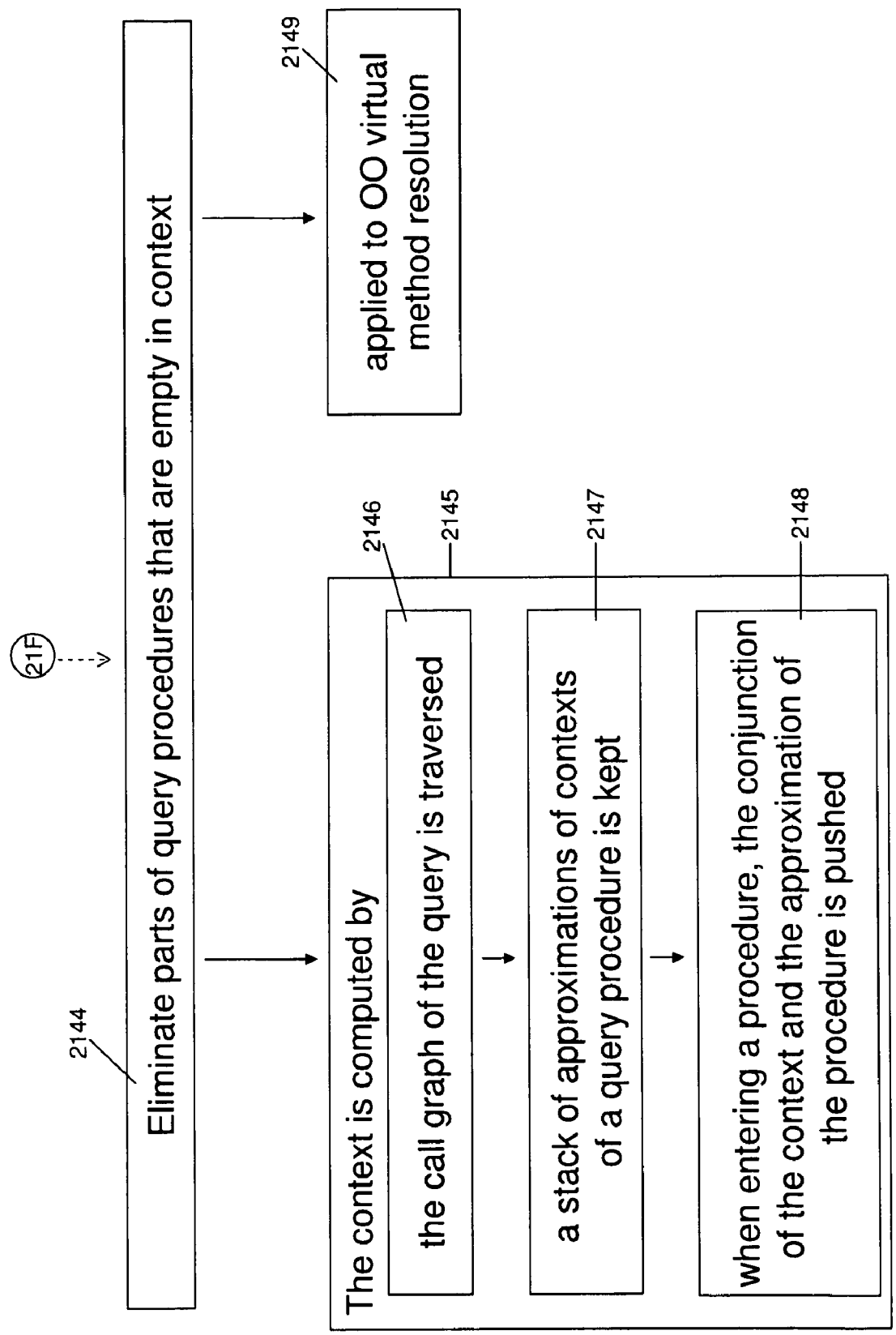
Figure 21G:
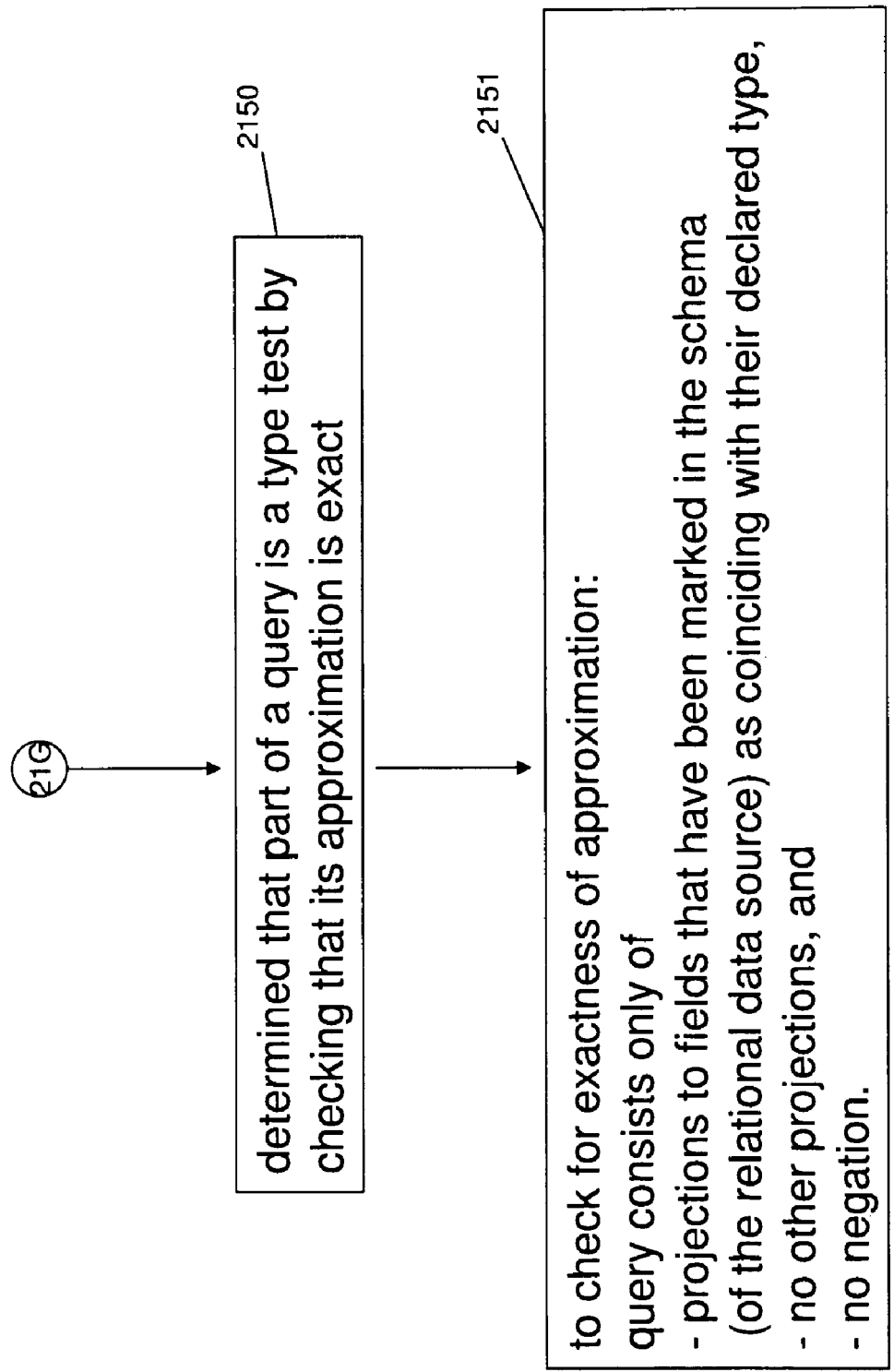

The dashed lines in FIG. 21A indicate further levels of detail. For example, FIG. 21B shows a more detailed operational hierarchy for entity types; FIG. 21C shows a more detailed operational hierarchy for computing approximations of query results; FIG. 21D shows a more detailed operational hierarchy for additional ways of approximating dependencies between field values; FIG. 21E shows a more detailed operational hierarchy for various types of error detection; FIG. 21F shows a more detailed operational hierarchy for various types of optimization; and FIG. 21G shows a more detailed operational hierarchy for eliminating unnecessary type tests.

With respect to FIG. 21B, the compiler 0106, at block 2108, can base the approximation of query results on a set of entity types with a partial order, meet operator and bottom type. Block 2110 shows that the bottom type represents the empty set of values, and the set represented by the meet of two entity types is the intersection of the sets represented by the two individual entity types. Blocks 2112-2114 show various ways in which entity types can be represented such as classes in an object-oriented hierarchy, description logic expressions, or automata.

Alternatively, the compiler 0106, at block 2115, can base the approximation of query results based on an arbitrary set of entity types. This arbitrary set of entity types, as shown in block 2116, can be optionally equipped with type facts relating the entity types. A partially ordered type hierarchy with a meet operator and a bottom type can then be automatically computed by taking Boolean combinations of entity types at block 2117. Such Boolean combinations of entity types, at block 2118, can be represented as binary decision diagrams (BDD), or in a form suitable as input to a SAT (generally referred to as Boolean Satisfiability) solver or theorem prover.

Figure 21H:
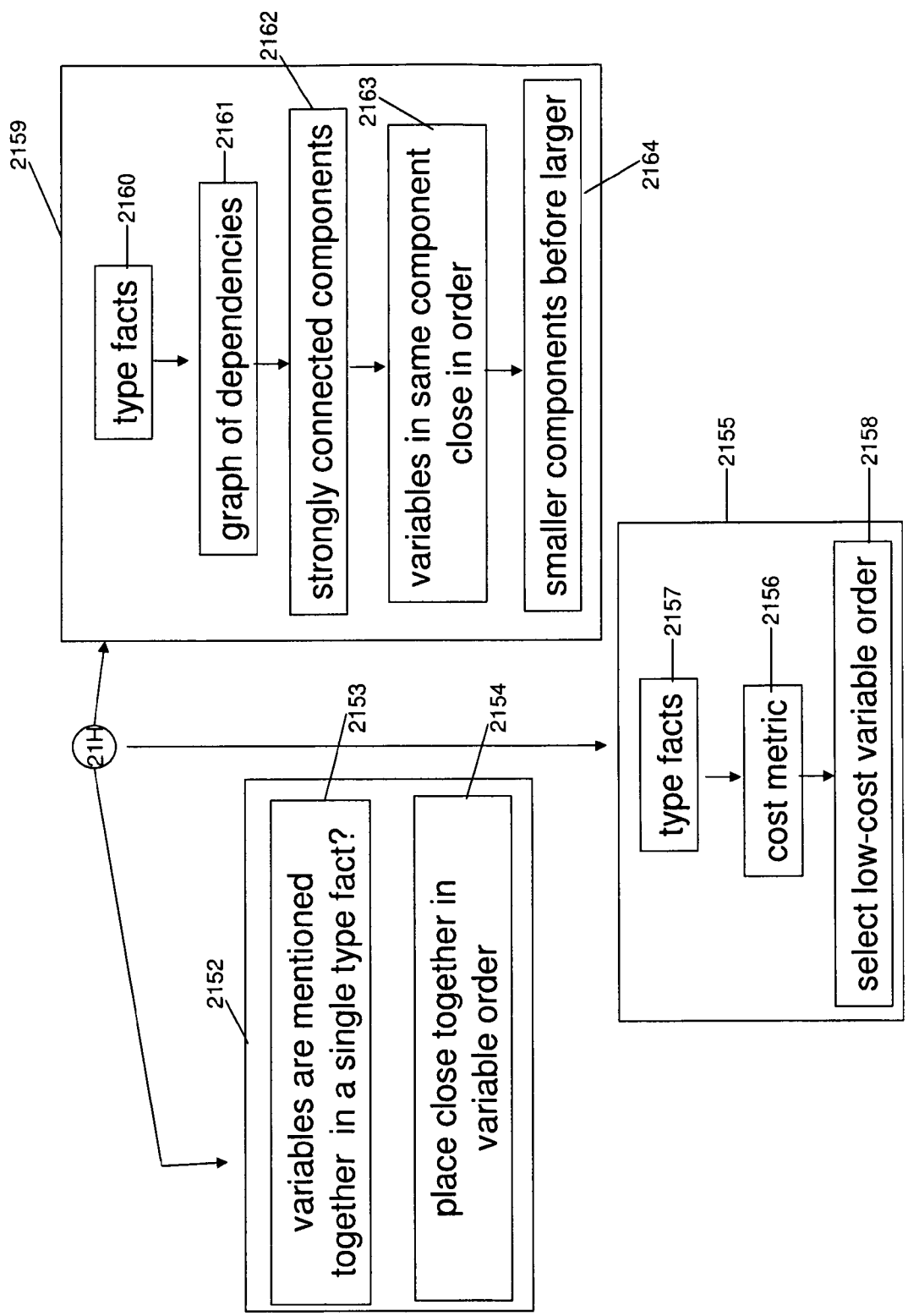

If represented as a BDD, the dependencies arising from the given type facts, as shown in block 2119, can be used by the compiler 0106 to determine the variable order of the BDD. FIG. 21H shows a more detailed operational hierarchy for using dependencies from type facts to determine BDD variable order. In particular, FIG. 21H shows that, in one embodiment, a determination, in block 2152, is made by the compiler 0106 as to whether variables are mentioned together in a single type fact (block 2153). If so, the compiler 0106, at block 2154, places variables that correspond to entities occurring in the same type fact close together in the variable order. Alternatively, the compiler 0106, at block 2155, defines a cost metric (block 2156) based on the type facts (block 2157) and selects a low-cost variable order at block 2158. In yet another embodiment, the compiler 0106, at block 2159, can use the type facts (block 2160) to generate a graph of dependencies (block 2161). While creating the graph of dependencies (block 2161) the compiler 0106, at block 2162, splits the graph into strongly connected components and at block 2163, places variables within the same component placed close together in the variable order and handles smaller components before larger ones at block 2164.

Figure 21I:
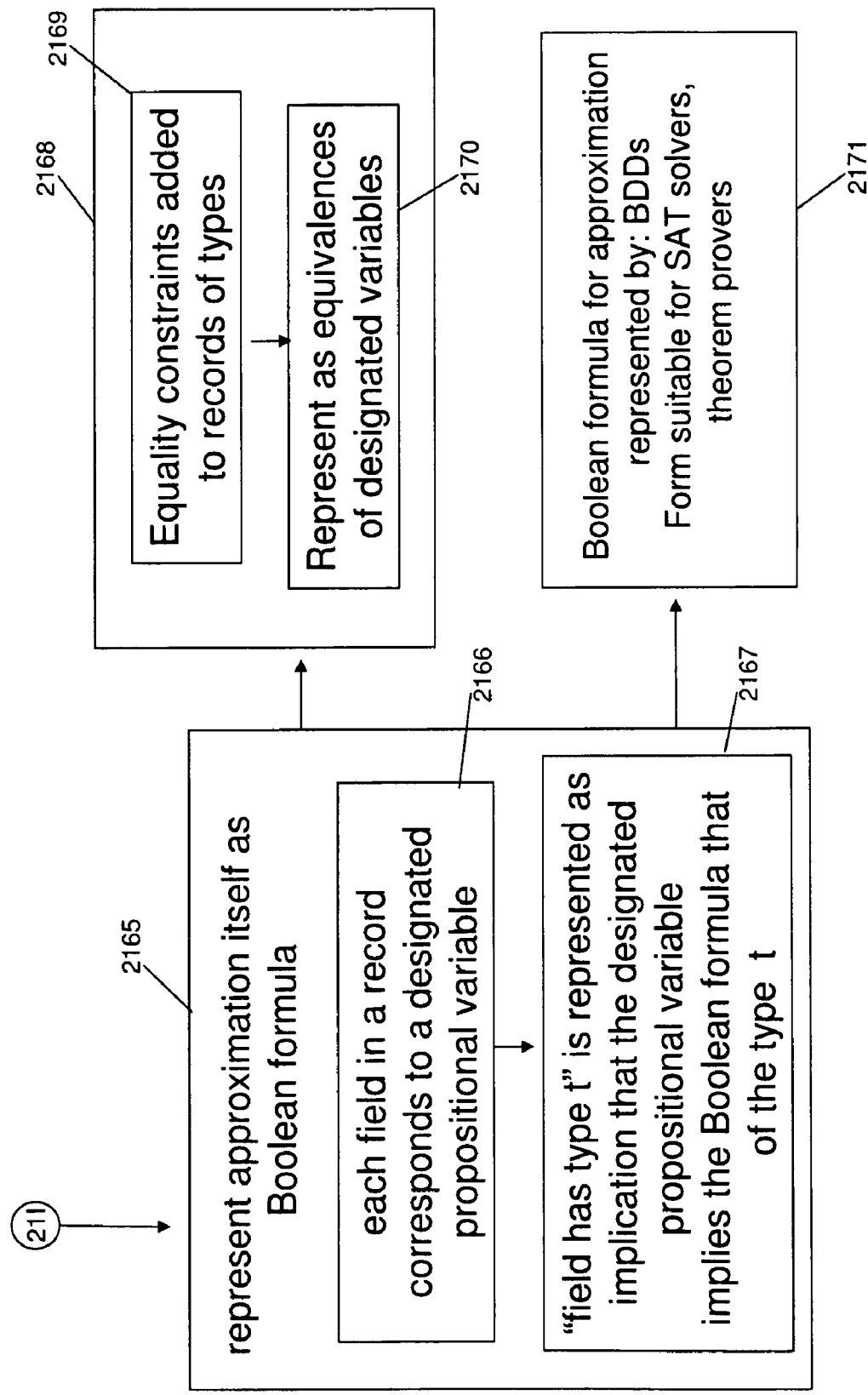

When the types from block 2115 are represented as Boolean formulas, the compiler 0106, at block 2165, can represent the approximation of query results as a Boolean formula, as shown in FIG. 21I. The compiler 0106, at block 2166, represents the approximation as a Boolean formula with each field in a record represented by a designated propositional variable. The assignment of types to fields, at block 2167, is then represented as an implication from the variable representing the field to the Boolean formula representing its type. An optional block 2168 shows that the compiler 0106, at block 2169, can add equality constraints between fields to records of types and then represent the equalities as logical equivalences, at block 2170, between the designated propositional variables corresponding to the fields. Such a representation of an approximation as a Boolean formula is then itself implemented by the compiler 0106, at block 2171, as a binary decision diagram (BDD), or in a form suitable as input for SAT solvers or theorem provers.

Turning now to FIG. 21C, two methods of computing approximations of query results are shown. In one embodiment, the compiler 0106, at block 2120, translates the query into expressions of relational algebra. The compiler 0106, at block 2121, then interprets the relational algebra operators as operators on sets of records of types to compute the approximation. In another embodiment, the compiler 0106, at block 2122, constructs a special database on which the compiler 0106, at block 2123, evaluates the query to compute the approximation. In both embodiments, the compiler 0106 can optionally employ equality constraints that determine which fields have equal values, at block 2124.

Figure 4:
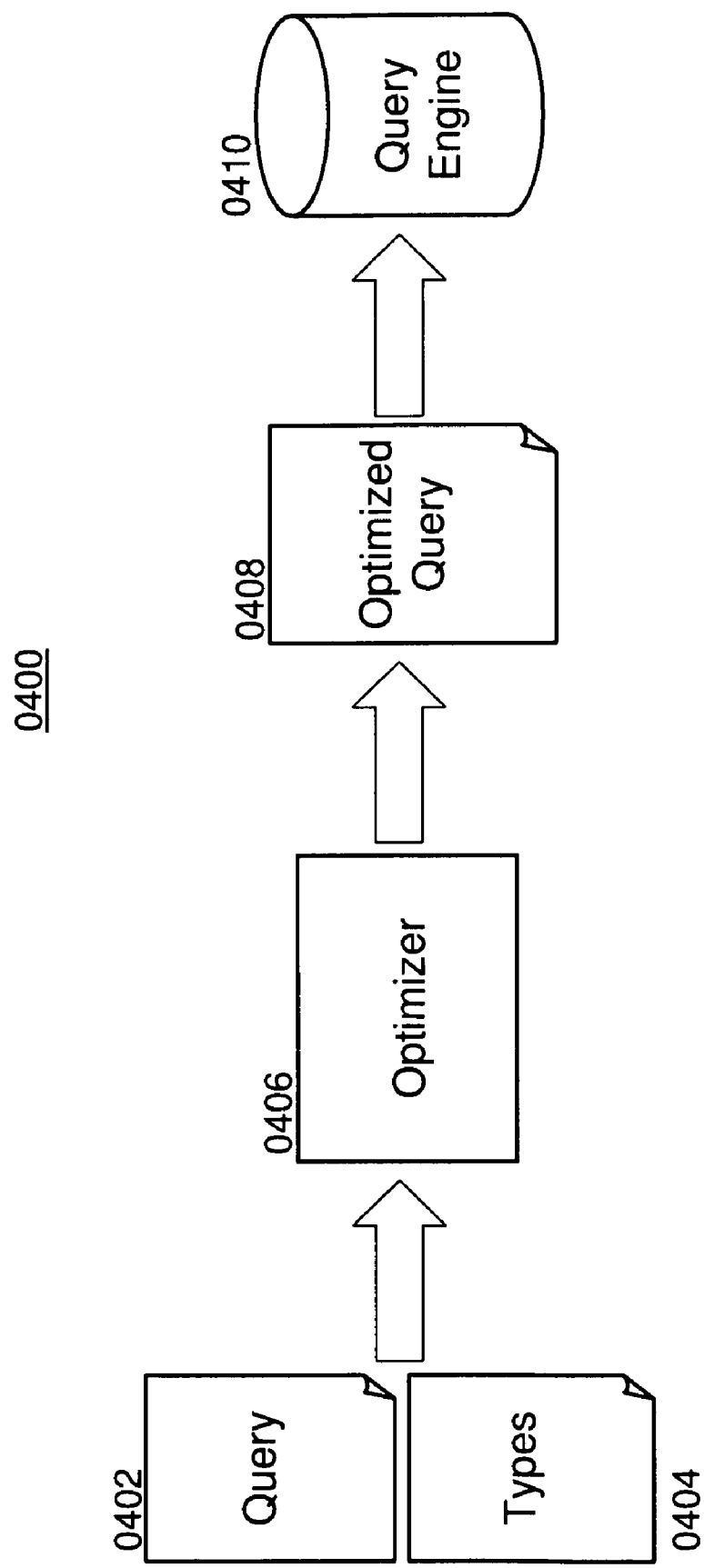
FIG. 4 illustrates how types are used in a query optimizer according to one embodiment of the present invention.

Apart from equality constraints, other ways, as shown by blocks 2125 and 2129 in FIG. 21D, and their substeps of approximating dependencies between field values can be used. For example, the compiler 0106, at block 2126, can record that values of a field are smaller than values of another field. The compiler 0106, at block 2127, can then model constant values as types and/or model dependencies as grammars at block 2128. It should be noted that the method of query result approximation discussed above is not restricted to a database environment, but can also be performed on a plurality of data sources, as shown in block 2129, for relational data, such as relational databases (block 2130), web services (block 2131), web pages (block 2132), or files on a hard disk (block 2133). It should be noted that FIG. 4 shows applications of result approximation to optimization (blocks 2129 and 2132).

The approximation of query results can be used by the compiler 0106, at block 2134, to find empty parts of a query, which are guaranteed to never yield a result, as shown in FIG. 21E. The compiler 0106, at block 2135, finds the smallest part of a query that is empty at block 2136. The compiler 0106, at block 2137, traverses all parts of a query. A stack, at block 2138, is kept of context approximations. When entering a query part, the conjunction of the context at the top of the stack and the approximation of the query part is pushed onto the stack at block 2139.

The process for finding empty query parts, at block 2140, can be embodied in a computer system for writing queries. The compiler 0106, at block 2141, warns the creator of empty parts and their likely cause of emptiness. Such a system can also provide, at block 2142, visual help for combining queries by conjunction, denoting compatible types by similar pictures at block 2143. The use of result approximations for error detection is further depicted in FIG. 3, which is discussed in greater detail below.

The approximation of query results can also be used, by the compiler 0106, at block 2144, to eliminate parts of queries that are empty in a certain context as shown in FIG. 21E. The context, at block 2145, is computed by traversing the call graph of the query at block 2146. A stack of context approximations is kept by the compiler 0106 at block 2147. When entering a procedure, the conjunction of the context at the top of the stack and the approximation of the procedure is pushed at block 2148. This elimination of empty query parts can be applied in optimization, in particular in the context of object-oriented virtual method resolution at block 2149.

Another use of the approximation of query results is to eliminate unnecessary type tests as shown in FIG. 21G. A part of a query, at block 2150, is determined by the compiler 0106 to be a type test by checking that its approximation of results is exact. To ascertain that the approximation is exact, it can be checked, at block 2151, that the query only contains projections to fields that are explicitly marked as coinciding with their declared type in the schema, and that it does not contain selections or negations.

Overall Architecture

Figure 1:
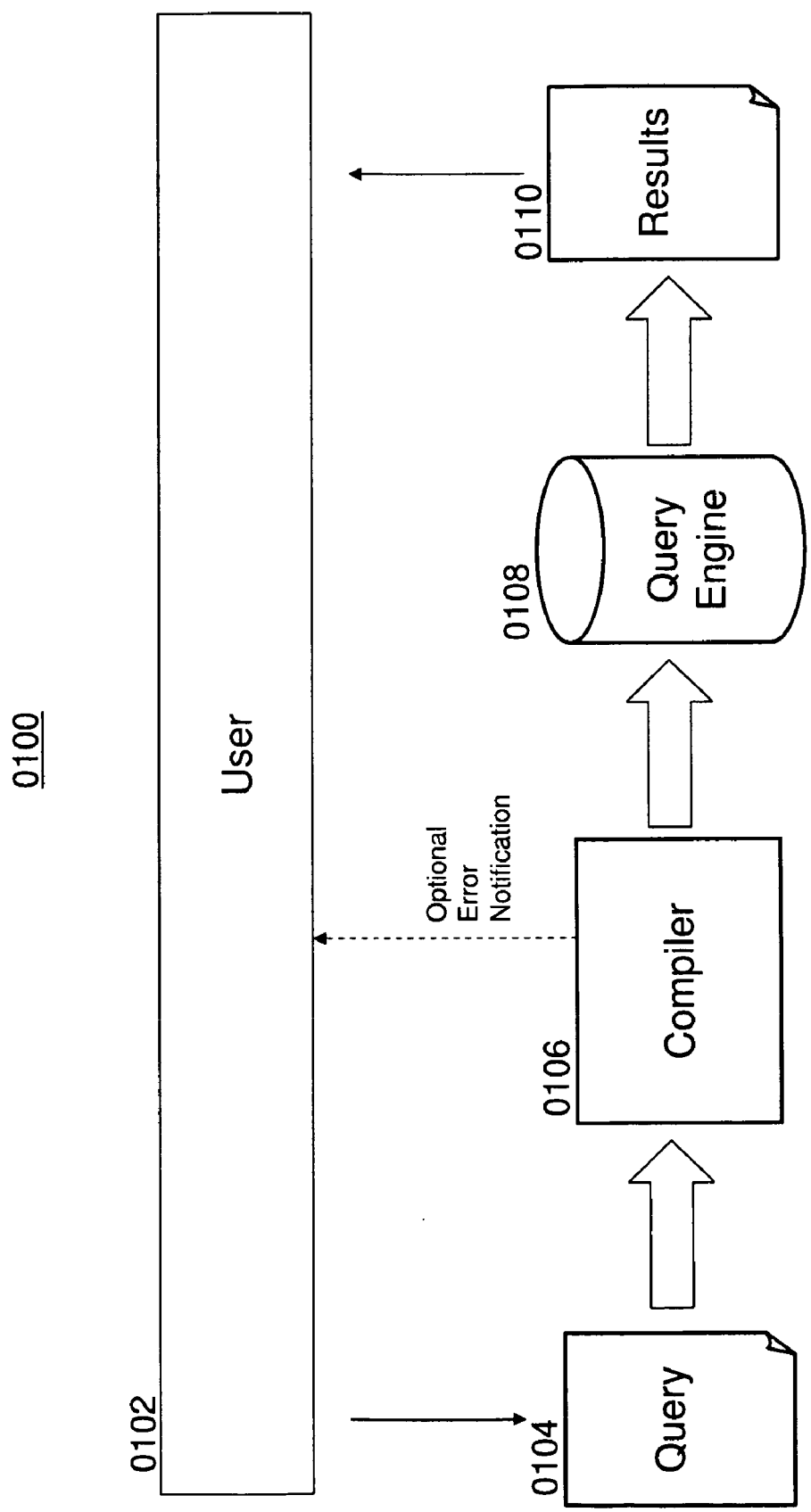
FIG. 1 is a diagram of an overall architecture of a system according to one embodiment of the present invention.

FIG. 1 shows an overall architecture 0100 for approximating queries over a relational data source for the purposes of optimization and error checking. In particular, FIG. 1 shows that a user 0102 creates a query 0104 that is received by a compiler 0106. The compiler 0106 performs the various processes discussed below to approximate queries over a relational data source for the purposes of optimization and error checking. For example, the compiler 0106 analyzes the query to check for errors and if errors do not exist then the compiler 0106 optimizes the query so that it is evaluated more efficiently by the query engine 0108. The compiler 0106 can optionally report any intermediate errors identified within the query 0104 to the user 0102. The results from the compile 0106 are then passed to a query engine 0108 for performing the query 0102, which can be optimized by the compiler 0106. The results 0110 from the query engine 0108 are then sent or displayed to the user 0102.

Overview of the Type Inference

Figure 2:
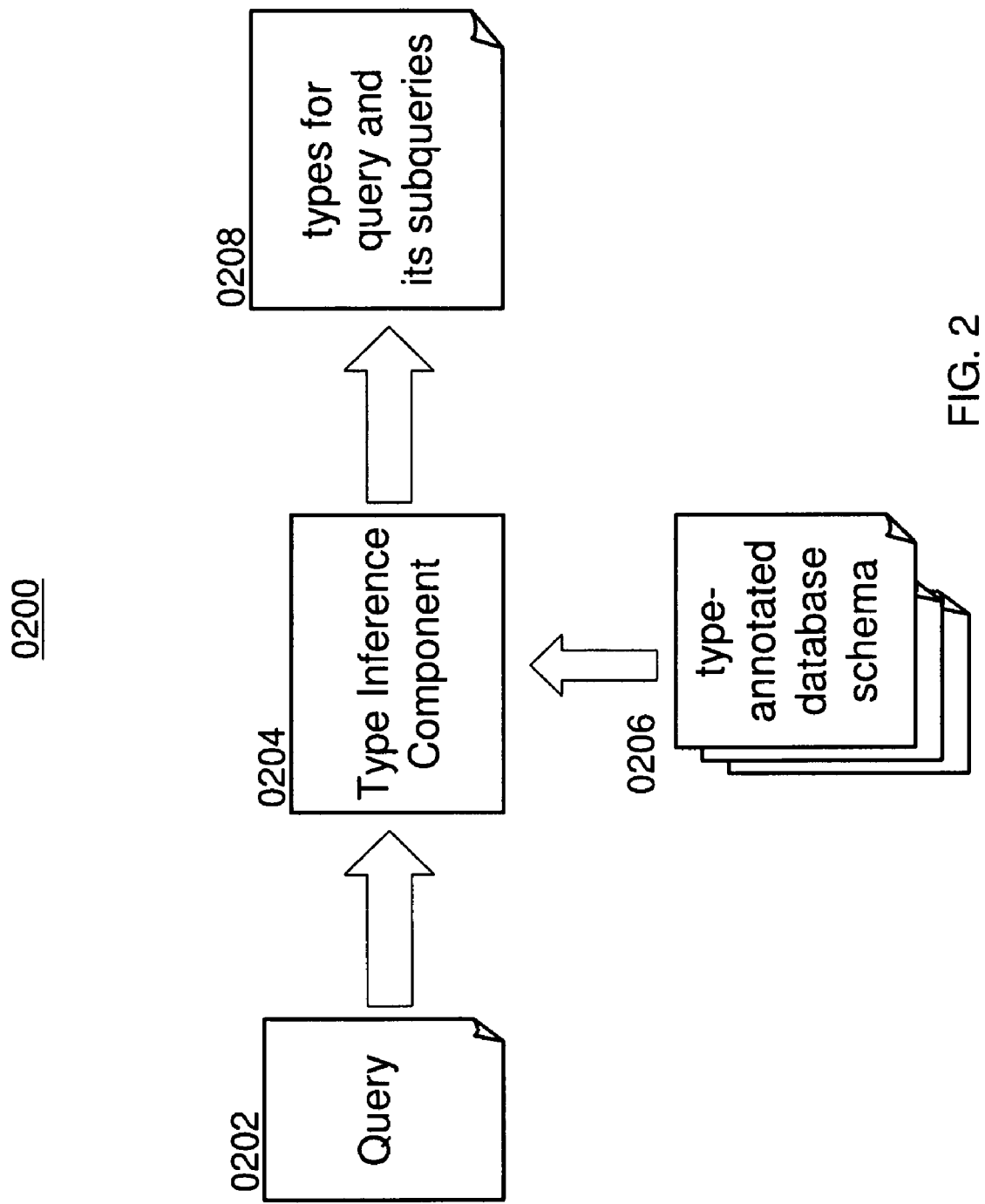
FIG. 2 is a diagram of a type inference component of the system of FIG. 1 according to one embodiment of the present invention.

FIG. 2 shows an overview 0200 of a type inference procedure performed by the compiler 0106. The type inference component 0204 receives the query 0202 as an input. The type inference component 0204 also receives a database schema annotated with types. The type inference component 0204 derives the type of the query and its parts 0208 from the types in the database. The type inference component 0204 annotates the query 0202 to indicate for every part of the query 0202 what the relevant types are. This process is discussed in greater detail below.

Overview of Error Identification

Figure 3:
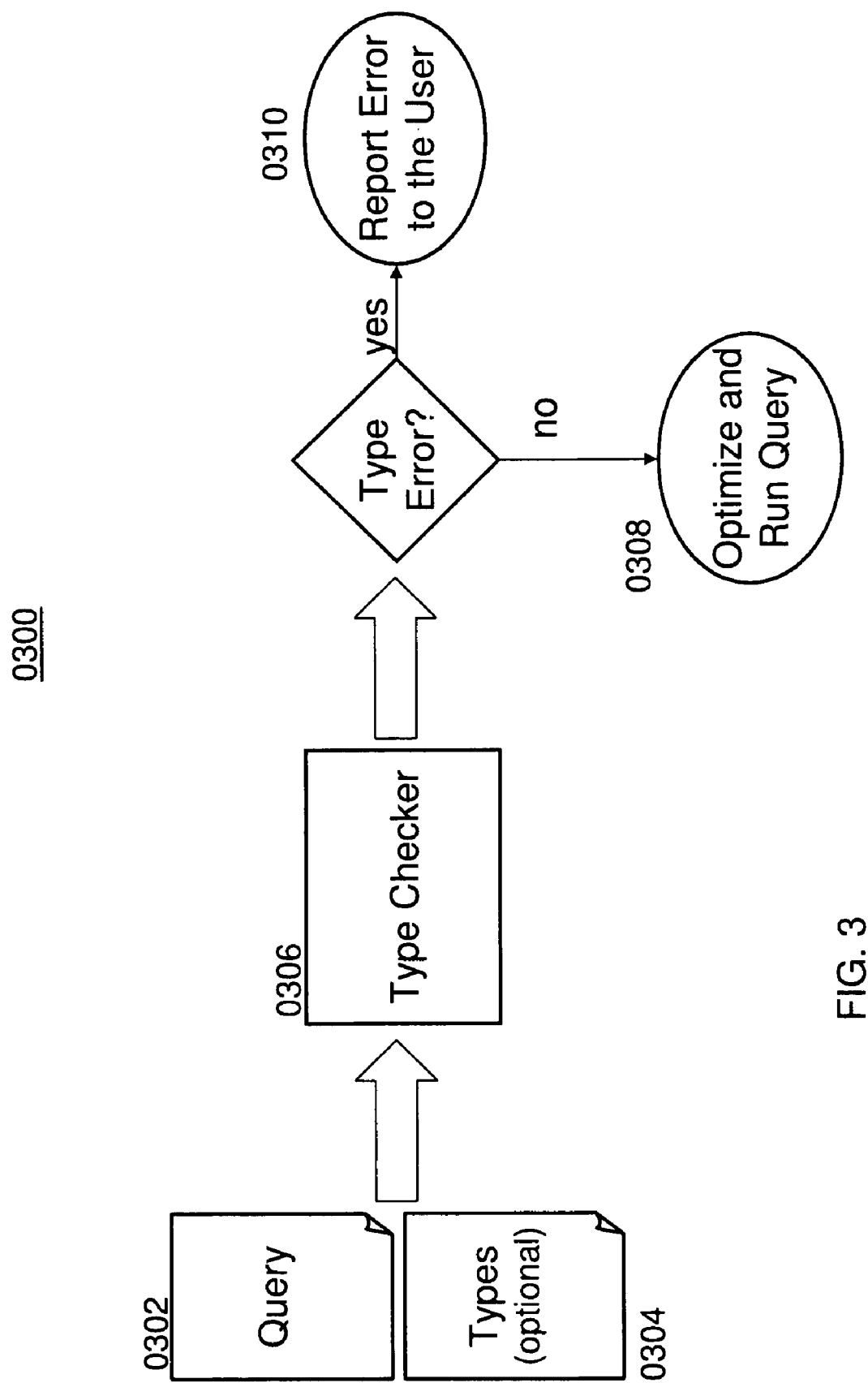
FIG. 3 is a diagram depicting the operation of a type checker according to one embodiment of the present invention.

FIG. 3 shows an overview 0300 of the process performed by the compiler 0106 for identifying errors in a query using types. A type checker 0306 component of the compiler 0106 receives as an input the query 0302 and optionally types 0304. The type checker 0306 uses these inputs to determine if the query 0302 comprises a type error. If errors are identified then the error(s) are reported to the user. If errors are not identified then the query 0302 is optimized by the compiler 0106 and then ran by the query engine 0108. These processes are discussed in greater detail below.

Overview of Using Types to Optimize Queries

FIG. 4 shows an overview 0400 of the process performed by the compiler 0106 for optimizing a query using types. A type optimizer 0406 component of the compiler 0106 receives as an input the query 0402 and types 0404. The optimizer 0406 uses these inputs to optimize the query 0402, as discussed in greater detail below. The optimized query 0408 is then sent to the query engine 0410. These processes are discussed in greater detail below.

Examples of the Various Embodiments of the Present Invention

For convenience and illustration purposes only, examples commonly used in database textbooks are used for illustration purposes throughout the following discussion.

Types for Queries

The input to the type inference procedure is a database schema annotated with types, together with a query. The procedure derives the type of the query and its parts from the types in the database. In the following discussion, the term "relational type" is used for such a type, which is just a relation over the set of types used as annotations on the database schema. The following example queries are written in the well-known query language Datalog, but the invention applies to any suitable query language. The variant of Datalog used here has mostly standard syntax, writing logical conjunction as a comma and disjunction as a semicolon.

Types describe sets of values in the database, and may include other types. As an example, consider a database of materials for constructing cycles. The types describe the different parts, and the relationships between parts (for instance, any bicycle is a cycle):

```
@part
    @cycle
        @bicycle
        @unicycle
    @wheel
    @saddle
    @pedals
    @spokes
    @tire
    @tube
```

The database includes a number of relations over values, each relation being annotated by the types of its fields. An example database schema is:

```
cycle(id : @cycle)
unicycle(id : @unicycle, s : @saddle, w : @wheel, p : @pedals)
bicycle(id : @bicycle, front : @wheel, s : @saddle, back :
@wheel, p : @pedals)
wheel(id : @wheel, t : @tire, s : @spokes)
tire(id : @tire, t : @tube)
```

Queries define derived relationships over the data, and are not necessarily annotated with types. The type inference procedure infers types for derived relationships. An example query relates each item to the parts it contains:

```
hasPart(x, y) :-
    unicycle(x, y, _, _) ; unicycle(x, _, y, _) ; unicycle (x, _, _, y) ;
    bicycle(x,y,_,_,_) ; bicycle(x,_,y,_,_) ; bicycle(x,_,_,y,_) ;
    bicycle(x,_,_,_,y) ;
    wheel(x, y, _) ; wheel(x, _, y) ;
    tire(x, y)
```

The type inference procedure deduces a relational type for the hasPart query from the types of individual relations. The type approximates the hasPart relation by a relation over the types appearing in the database, in this case:

```
{(@unicycle, @saddle), (@unicycle, @wheel), (@unicycle, @pedals),
(@bicycle, @wheel), (@bicycle, @saddle), (@bicycle, pedals),
(@wheel, @tire), (@wheel, @spokes),
(@tire, @tube)}
```

Figure 5:
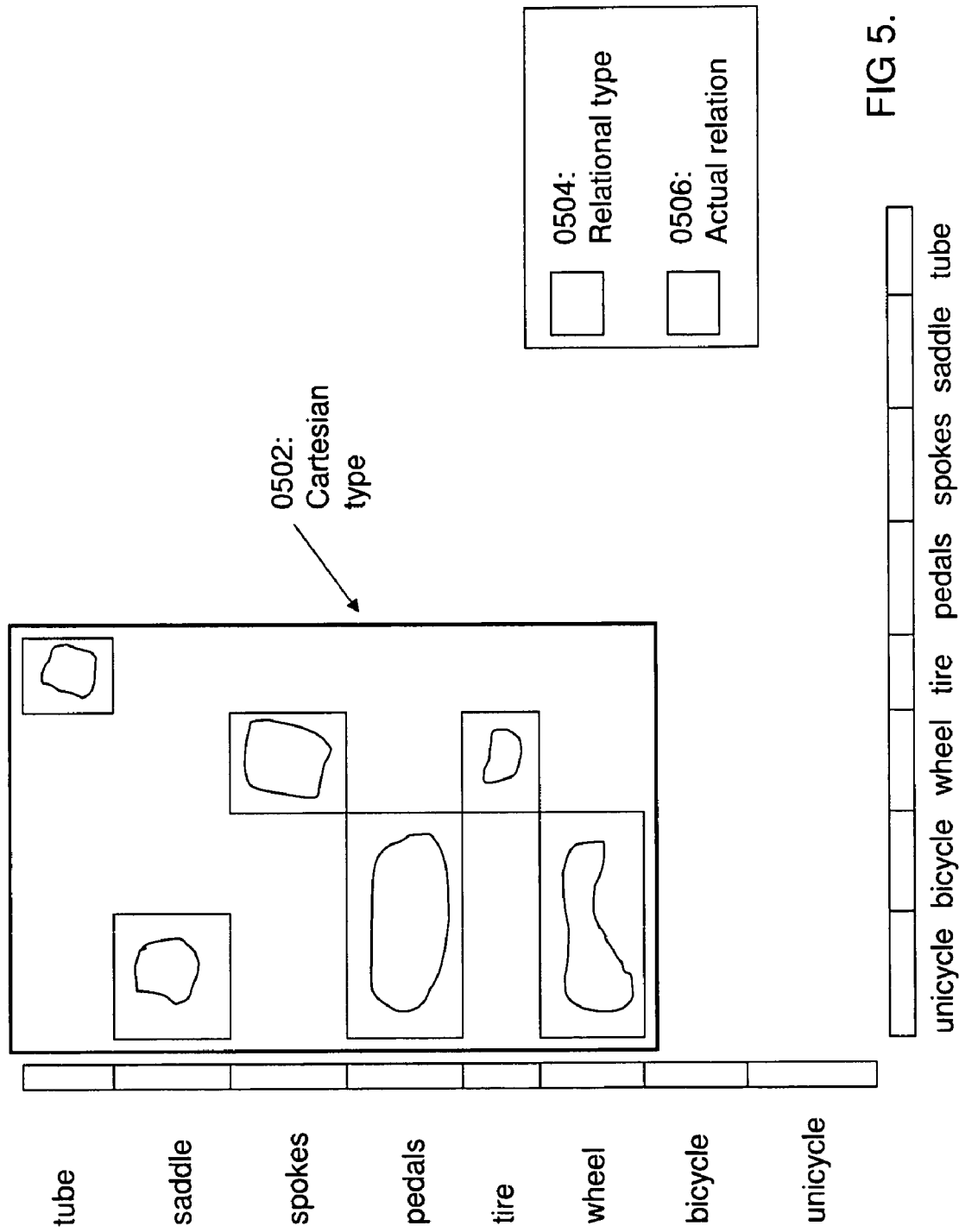
FIG. 5 shows how a relational type approximates the set of values in an actual relation, and why such a relational type is a more accurate approximation than the Cartesian types in conventional systems according to one embodiment of the present invention.

The type of hasPart shows a clear departure from prior art: previous proposals for inferring query types infer types independently for each field—thus, in prior art, the most specific type of hasPart consists of the Cartesian product of the type of x and the type of y. A type that is a Cartesian product of types of individual fields is called a Cartesian type. In contrast, the inferred type of hasPart gives precise relationships between possible types of fields: it models dependencies between different fields. This is illustrated in FIG. 5, which shows the Cartesian type 0502 derived in conventional systems; while box 0504 shows the relational type above. This type approximates the actual hasPart relation (shown by box 0506) more closely, allowing for better error checking and optimization.

In addition to relational types as above, the various embodiments of the present invention allow equalities between fields to be tracked in types. As an example, consider the following query:

sameCycle(x, y):- cycle(x), x=y

Figure 6:
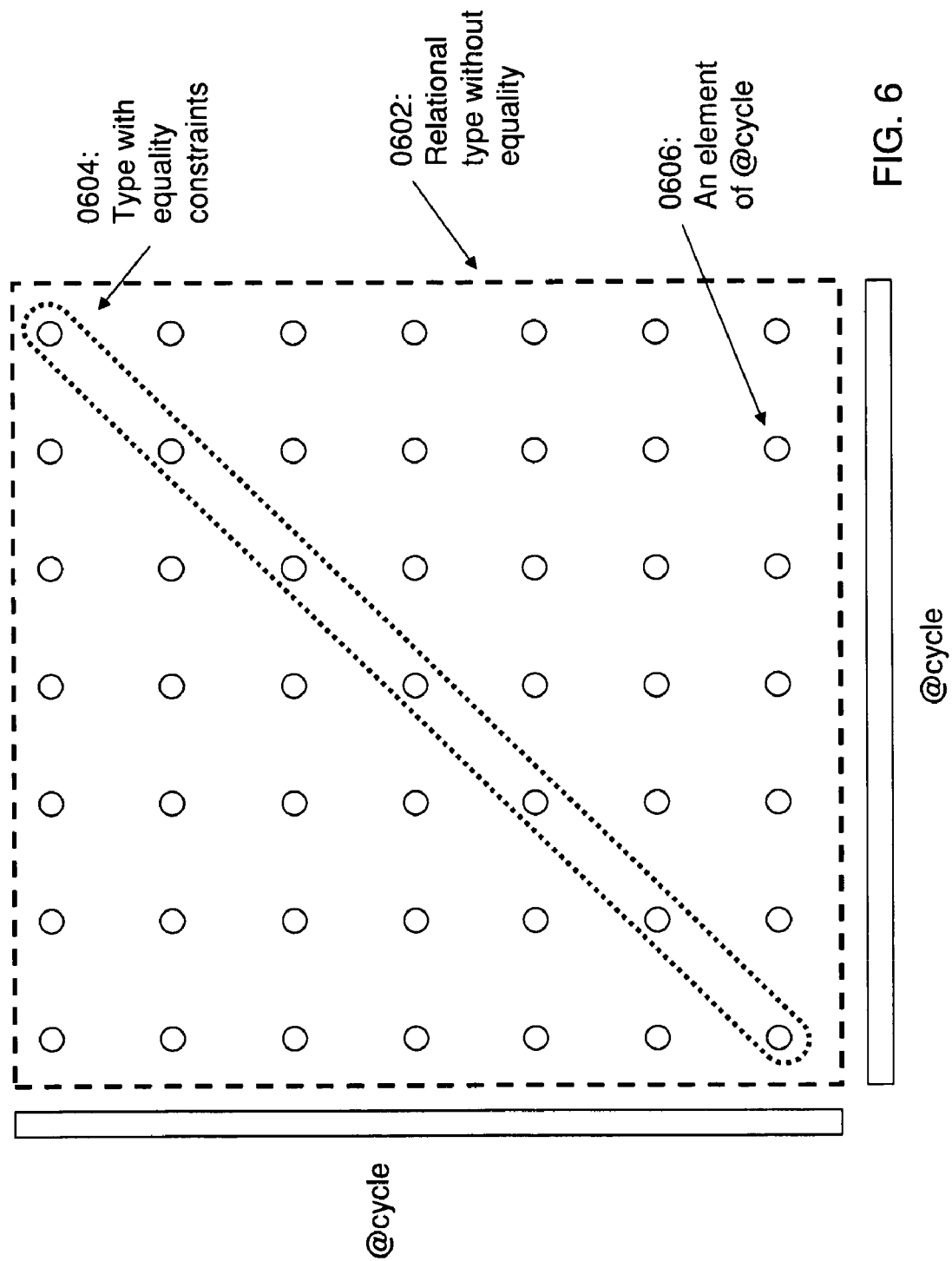
FIG. 6 illustrates types with equality constraints, and shows how such constraints yield a more accurate approximation of the set of values in a relation than a relational type without equality constraints according to one embodiment of the present invention.

The most precise relational type for sameCycle would be {(@cycle, @cycle)}. However, the various embodiments of the present invention can derive a more refined type that records the equality of the fields x and y. Such a type comprises: the types of the fields, together with a partition of fields such that two fields in the same component of the partition have equal values. The type of the above relation is {(@cycle, @cycle|{{x,y}})}, encoding the additional equality constraint that x=y (since x and y are in the same component of the partition). This is depicted in FIG. 6: the relational type 0602 (as defined by the larger dashed lines) is less precise than the equality type 0604 (as defined by the smaller dashed lines. Each darkened circle is an element 0606 of @cycle.

Using Types for Error Checking

The types inferred for the previous examples are used to find errors in queries, and to optimize queries. These are illustrated by example below. Consider first the query:

erroneous(x, y):- hasPart(x, y), @unicycle(y)

The derived type of erroneous is empty, since the type of y in hasPart (FIG. 5) cannot be @unicycle. A query that is empty regardless of the contents of the relational data source is said to be erroneous, and is reported as such to the user.

The refined (compared to conventional systems) types allow better error checking, by finding more empty relations (and thus more possible errors). The following query is shown to be an error using relational types, but not using Cartesian types:

erroneous2(x, y):- hasPart(x, y), @bicycle(x), @spokes(y)

There is no pair (@bicycle, @spokes) in the type of hasPart (FIG. 5), so this is a type error. However, a Cartesian type analysis would not flag this as a type error.

Equality constraints (FIG. 6) give yet more precise error checking. The following query is shown to be erroneous using equality constraints, but not with only relational types:

erroneous3(x, y):- sameCycle(x, y), @bicycle(x), @unicycle(y)

As types are used to find queries producing empty relations and report such queries as errors to the user, the more precise notion of type allows better error reporting compared to conventional systems.

Using Types for Optimization

Whenever a part of a query is found to have an empty type, it is not necessary to evaluate this part, as the result is guaranteed empty. This is used to optimize query evaluation. Consider as an example:

query(y):- @bicycle(x), hasPart(x,y)

The hasPart relation is defined as the union of ten relations. However, as the type of x is @bicycle, some of these cannot produce any values, and so are given empty types in the context in which hasPart is used. Thus the program may be transformed to:

hasPart_Bicycle(x, y) :-
    bicycle(x,y,_,_,_) ; bicycle(x,_,y,_,_) ;
    bicycle(x,_,_,y,_) ; bicycle(x,_,_,_,y).
query(y) :- @bicycle(x), hasPart_Bicycle(x,y)

Execution of the transformed program is likely to be more efficient than execution of the original program, while giving the same results. Whenever a part of a query has an empty type in the context in which it is used, it may be replaced by the logical value false, rather than being evaluated. Standard logical simplifications may then be applied.

The inferred types are further used to eliminate redundant type checks. In the above transformed program, the relation hasPart_Bicycle only contains pairs (x, y) in which x is a bicycle. This is reflected in the type of hasPart_Bicycle. The test @bicycle(x) in the query is therefore redundant, and can be eliminated, giving the program:

hasPart_Bicycle(x, y) :-
    bicycle(x,y,_,_,_) ; bicycle(x,_,y,_,_) ;
    bicycle(x,_,_,y,_) ; bicycle(x,_,_,_,y).
query(y) :- hasPart_Bicycle(x,y)

This query can be evaluated more efficiently than the original query. In general, when a type test is guaranteed to succeed (because the type of the field is known), it may be replaced by the logical value true. As above, if the test is guaranteed to fail then it may be replaced by false.

The Type Inference Procedure

The procedure for inferring types for queries is described in the following discussion. First, types (both annotating the database and derived types) are defined. The procedure by which the types of queries can be derived is then discussed.

Entities and Types

Figure 7:
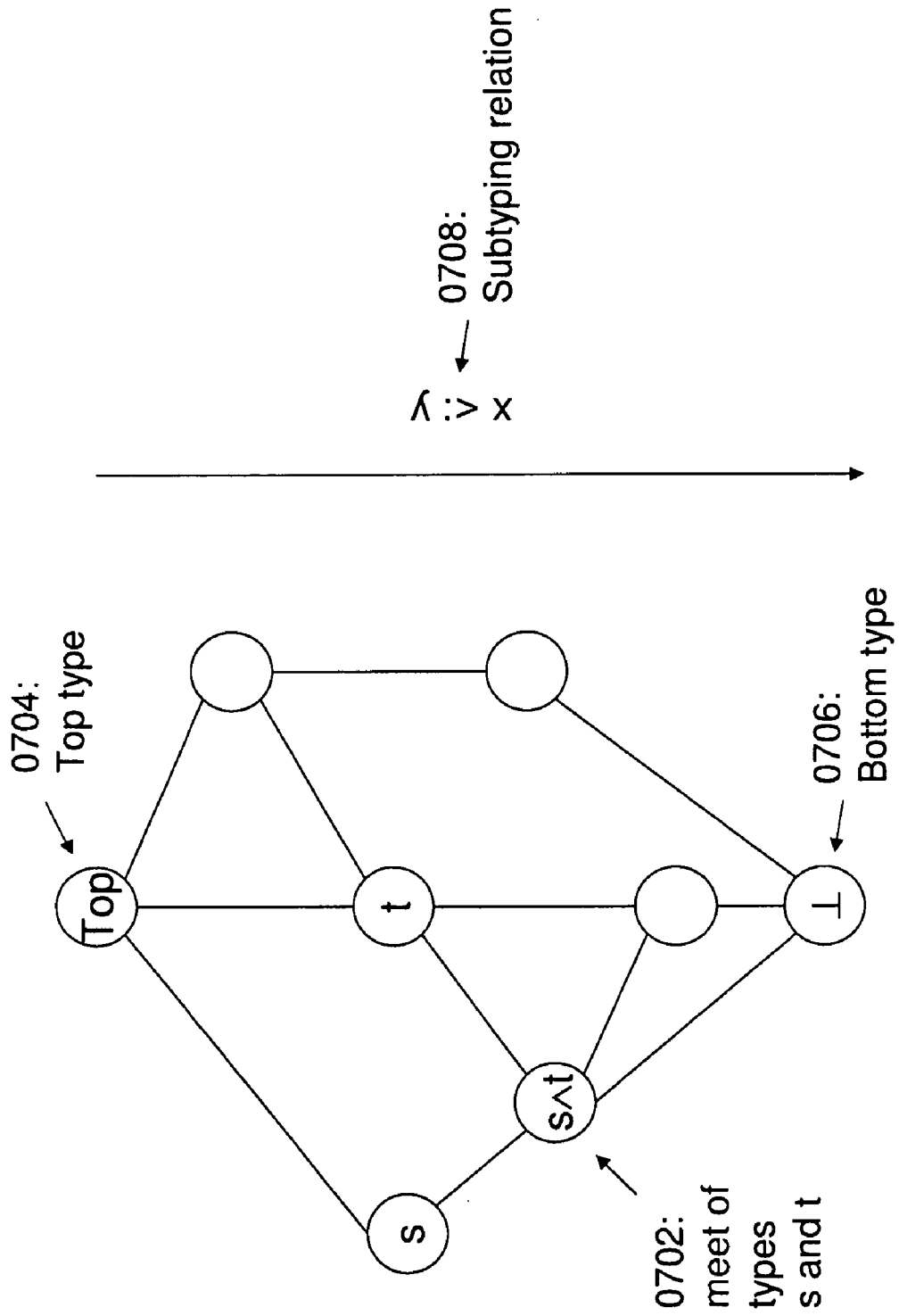
FIG. 7 depicts a general type hierarchy according to one embodiment of the present invention.
Figure 8:
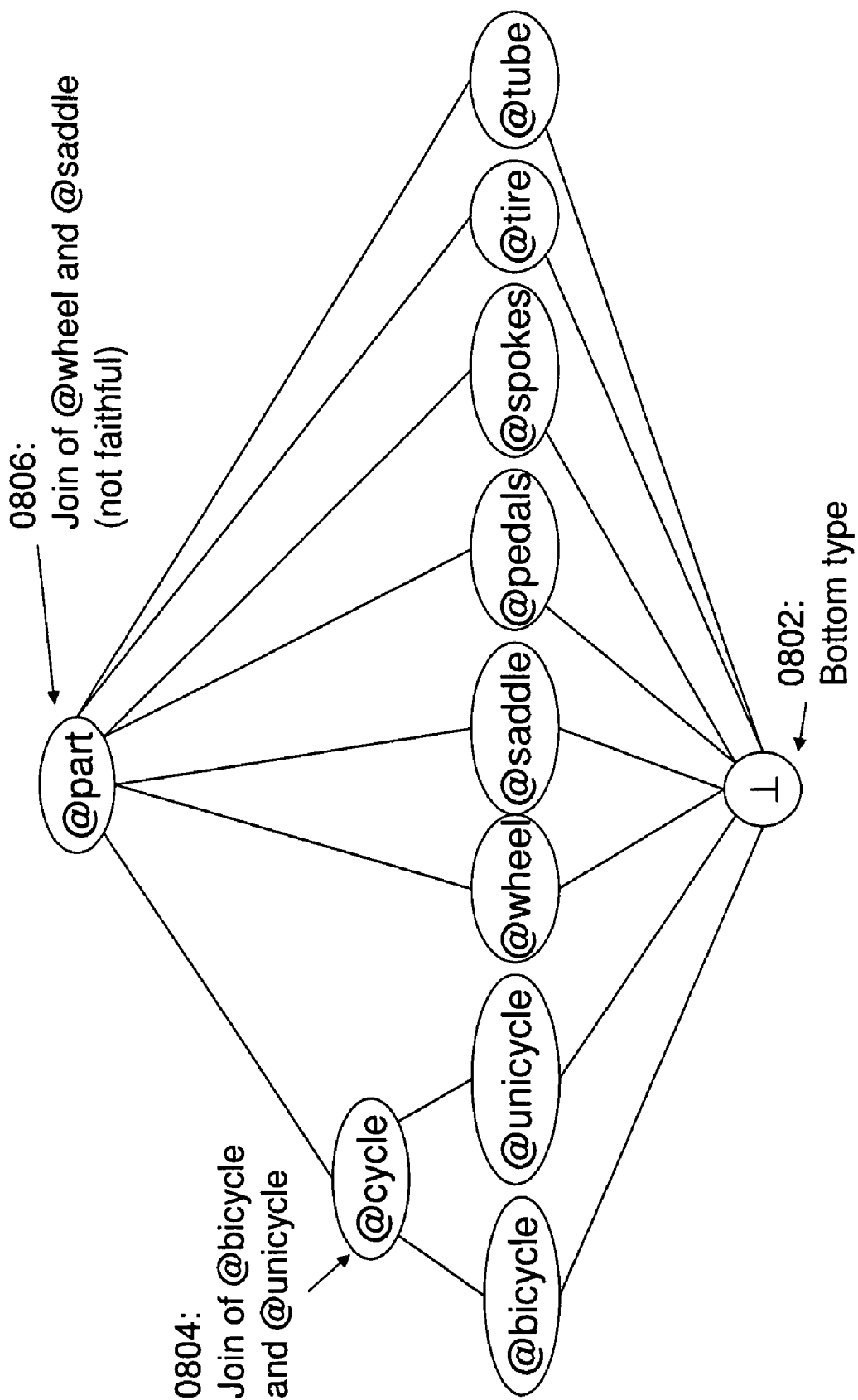
FIG. 8 shows the particular type hierarchy employed in the example of a database of cycle parts according to one embodiment of the present invention.

The database schema is an input to the procedure at the core of this invention. It enumerates the relations defined in the relational data source, and specifies, for each relation, the number of variables it ranges over. Each such variable is annotated with an entity type, or entity (conventionally written with an @ sign in the text), by the designer of the database. The entities used are arbitrary. This allows the various embodiments of the present invention to be used in a plurality of contexts, for instance in object-oriented databases or description logics. The entities form a hierarchy, defined by the subtype relation <:. The statement t<:q means that the entity t is a subtype of the entity q. The subtype relation is expected to be a partial order. A general entity type hierarchy is illustrated in FIG. 7. A particular hierarchy for the example of cycle parts is shown in FIG. 8.

If no subtyping order on entities is provided, then one (the trivial order) can be constructed by defining t<:t for all t, with no other subtyping relations. Entities denote sets of values. The set of values denoted by an entity depends on the contents of the database; in the following a fixed database is used. The set of values represented by an entity is written [t], and this is referred to as the interpretation of t. The interpretations of entities are expected to satisfy the following condition: whenever s<:t, [s] ⊆ [t]. This is satisfied by the trivial order.

Type Facts

Optionally, additional facts relating types may be stated alongside the set of entities. These are known as type facts. The purpose of these type facts, in one embodiment, is to allow the database designer to specify extra domain-specific information. A type fact is a Boolean formula relating types. Example type facts are: t⇒q, meaning that every element of t is an element of q; $\neg(t \wedge q)$, meaning that t and q are disjoint, and $t \Rightarrow q_1 \vee \ldots \vee q_n$, meaning that every element of t is an element of one of the types $q_i$. Any logical formula could be used, however. The type facts base (or TFB) is a set of logical formulas, interpreted as the conjunction of the formulas it contains. The intention is that the TFB determines the subtype order on types, as well as any other facts that may be provided as annotations on the database schema. The construction of the TFB proceeds as follows.

All type facts are added to the TFB. The subtyping relation is reflected in the TFB in the following way: whenever s<:t, the proposition s⇒t is added to the TFB. There are no other facts in the TFB. The interpretation of entities is required to satisfy the following condition. Informally, any fact in the TFB must hold of the interpretation of entities. More precisely, for any formula in the TFB, its interpretation is defined by replacing each propositional symbol t by the formula x ∈ [t], and adding a universal quantifier over x to the whole formula. For example, the interpretation of $t \Rightarrow q$ is $\forall x. x \in [t] \Rightarrow x \in [q]$; while the interpretation of $\neg(t \wedge q)$ is $\forall x. \neg x \in [t] \wedge x \in [q]$). The interpretation of each formula in the TFB is then required to hold as a statement about sets.

Type Hierarchies

The various embodiments of the present invention optionally make use of a number of properties of the entity hierarchy, which may or may not be satisfied in a particular embodiment. An entity hierarchy is said to be a type hierarchy if it satisfies the properties detailed below, and has no type facts. Members of a type hierarchy may simply be referred to as types. It is optional for an entity hierarchy to satisfy the conditions below. A procedure for transforming an entity hierarchy that does not satisfy the assumptions into a type hierarchy is discussed in the next section. If the entity hierarchy satisfies the conditions of a type hierarchy, and if no type facts are provided, then it is not necessary to transform the entity hierarchy. It is always safe to apply the transformation to an entity hierarchy, even if it already has the properties of a type hierarchy.

If type facts are provided with the entity hierarchy, but it otherwise meets the conditions of a type hierarchy, then it is not necessary to apply the transformation to create a type hierarchy from the entity hierarchy. In such cases, however, precision may be lost as any type fact not implied by the entity hierarchy is discarded.

The type hierarchy is expected to obey the following: Whenever t and q are types, there is a type r such that (1) r<:t, (2) r<:q, and (3) for any type s such that s<:t and s<:q, it is true that s<:r. It can be shown that r is unique; it is called the meet of s and t and is written $s \wedge t$. In words, the meet of two types is the largest type that is a subtype of both. The meet 0702 is shown in FIG. 7. FIG. 7 also shows the top type 0704, the bottom type 0706, and a subtyping relation 0708. The operator ∧ is referred to as the meet operator.

The type hierarchy is expected to contain a type ⊥ (called the bottom type) such that ⊥<:t for all types t. The type hierarchy is further expected to contain a type Top such that t<:Top for all types t. There are some additional constraints on the interpretations of types. They are expected to satisfy the following: (1) whenever s<:t, [s] ⊆ [t]; (2) $[s \wedge t]$=[s]∩[t], (3) [⊥]=∅. In words, (2) and (3) say that the set of values in the meet of two types is the intersection of the values in those types, and the set of values in the bottom type is empty. This completes the list of requirements an entity hierarchy must satisfy in order to be a type hierarchy.

In what follows, two types t and s are said to be compatible if $t \wedge s \neq \bot$. Types in a type hierarchy are said to have joins if for any types t and q, there is a type r such that (1) t<:r, (2) q<:r and (3) for any type s such that t<:s and q<:s, it is true that r<:s. It can be shown that if r exists, it is unique; it is called the join of s and t and is written t ∨ q. Informally, the join of two types is the smallest type that is a supertype of both. Types are not required to have joins. If further [s ∨ t]=[s]∪[t], then the type hierarchy is said to have faithful joins.

Types in a type hierarchy are said to have complements if for any type t there exists a type $\neg t$ such that [t]∪[$\neg t$]]U, where U denotes the universe of all values. Note that any type hierarchy can be made to have complements by choosing [$\neg t$]=U. If moreover [$\neg t$] U\[t], where \ is the operation of set difference, then the type hierarchy is said to have faithful complements. The type hierarchy for the cycle parts example is illustrated in FIG. 8, wherein the bottom type 0802; a join 0804 of @bicycle and @unicycle; and a join 0806 of @wheel and @saddle (not faithful) are shown. The top type is @part. The meet of @wheel and @saddle is ⊥, while the meet of @cycle and @bicycle is @bicycle. This particular hierarchy has joins; the join of @bicycle and @unicycle is @cycle, while the join of @wheel and @saddle is @part. However, the join is not faithful, as [@part]≠[@wheel]∪[@saddle] in general.

From Entities to Types

Where a given entity hierarchy does not meet the requirements of being a type hierarchy, the following transformation can be applied to obtain a type hierarchy. The types in the type hierarchy created by this transformation are logical propositions over entities (also called propositional types). A propositional type is defined to be any Boolean formula built from entities using the standard Boolean combinations of conjunction, disjunction, negation and implication. Equality of propositional types is defined by the following: s=t if and only if T ∧ s is logically equivalent to T ∧ t; where T the formula obtained by conjoining all the facts in the TFB.

The bottom type is the logical proposition false. The top type is the logical proposition true. The meet operator on types is given by logical conjunction. The subtype relationship on propositional types is given by the following: s<:t if and only if $T \wedge s \Rightarrow t$, where as above T is the formula obtained by conjoining all the formulas in the TFB. It can be shown that the above definitions make propositional types into a type hierarchy satisfying the required constraints above.

The transformation outlined above can be applied to any entity hierarchy, even if it already was a type hierarchy, though it is only required if the entity hierarchy was not already a type hierarchy. If this transformation is applied to the cycle parts hierarchy, the meet of the propositional type @wheel and the propositional type @saddle is false, since no part is both a wheel and a saddle. The propositional type hierarchy has joins, which are given by logical disjunction. Note that these joins are faithful. For example, the join of the propositional types @wheel and @saddle is the propositional type "@wheel or @saddle", whose interpretation is indeed the union of the original two types. The propositional type hierarchy also has faithful complements, given by logical negation.

Example Use of the Propositional Type Transformation

To illustrate the transformation from an arbitrary entity hierarchy to a propositional type hierarchy, consider a database representing people and their occupations, with the following entities: @person, @male, @female, @employee, @student, @parttime, @manager. Suppose no subtype relation is given, but the following type facts are specified (forming the type fact base):

(1) @male⇒@person
(2) @female⇒@person
(3) @person⇒@male∨@female
(4) ¬(@male∧@female)
(5) @employee⇒@person
(6) @student⇒@person
(7) @parttime⇒@employee
(8) @student∧@employee⇒@parttime
(9) @manager⇒@employee
(10) @manager⇒¬@parttime Some of these type facts are illustrated in FIG. 9 as Venn diagrams. For instance, (1) states that every @male is a @person (0902); (3) states that every @person is either a @male or a @female (0904) while (4) states that @male and @female are disjoint. Putting all of these facts together, one can deduce that @male and @female partition the type @person (0906). A more complex example is given by (8), which states that any element that is both a @student and an @employee must also be @parttime.

After applying the transformation, the type hierarchy consists of the set of propositional types. Meets are given by logical conjunction, and joins by logical disjunction. The bottom type is false, and the top type is true. Equality of types is defined as logical equivalence up to conjoining types with the type facts (1) through (10) listed above.

Examples of propositional types and operations on propositional types are listed below. As equality of propositional types is logical equivalence up to conjunction with the TFB, distinct formulas may nevertheless denote the same type. The examples illustrate cases where this occurs. Throughout, let T be the conjunction of the formulas in the TFB ((1) through (10)).

Both @male and @student are subtypes of @person. This can be deduced from facts (1) and (6) in the TFB. Formally, T ∧ @male ⇒ @person, so @male is a subtype of @person; while T ∧ @student ⇒ @person, so @student is a subtype of @person. The type @male ∧ @student is the meet of @male and @student, and represents all male students. This type is a subtype of both @male and @student, since T ∧ @male ∧ @student ⇒ @male, and T ∧ @male ∧ @student ⇒ @student. In fact, in this case the type fact base formula T is not necessary to deduce the implication.

The type @parttime ∧ @manager is the propositional type designating all part-time managers. However, using type fact (10), it is clear that this is equivalent to the propositional type false (the bottom type). More precisely, T ∧ @parttime ∧ @manager is logically equivalent to T ∧ false, so that this type is the bottom type. The type @male ∨ @female is the join of @male and @female, and represents everything either male or female. Using type facts (1), (2) and (3) it can be seen that this is equivalent to @person. The type @person ⇒ ¬@ @male ∧ ¬ @student is the propositional type of every non-male person that is not a student, which (using type facts (1) through (4)) is equivalent to @female ∧ ¬ @student. Finally, the type ¬@ @employee is the complement of the @employee type, and denotes all values that are not employees.

Partitions

Figure 10:
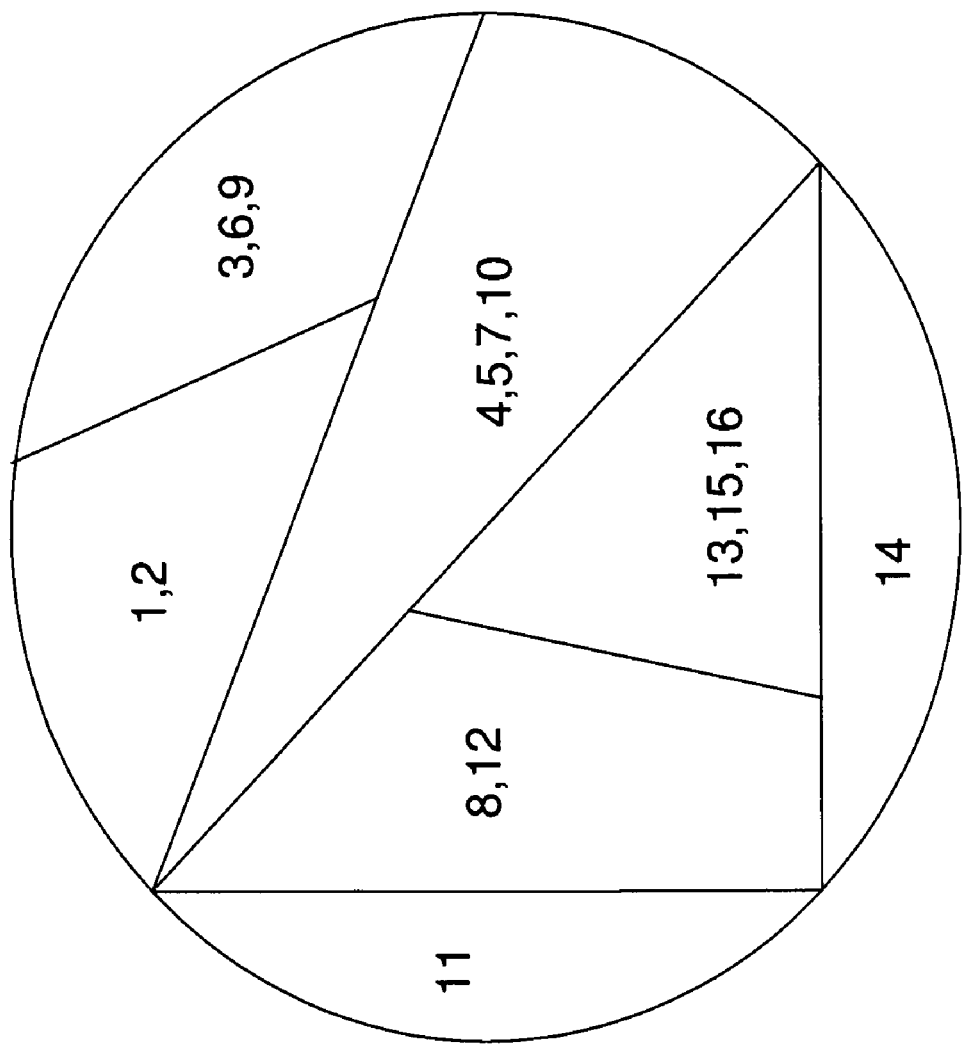
FIG. 10 shows an example partition of the set of numbers {1 ... 16}.

A partition of a set S is a set of nonempty subsets of S that are pairwise disjoint; and whose union forms S. An example partition is illustrated in FIG. 10 where a partition 1002 as a set of sets {{1,2}, {3, 6, 9}, {4, 5, 7, 10}, {8, 12}, {11}, {13, 15, 16}, {14}} and a graphical representation 1004 of the partition 1002 are shown. A partition p is coarser than a partition q if each set in q is a subset of some set in p. A partition p equates x and y if x and y lie in the same component of p. For any two partitions p and q there is a unique partition p∧q such that p∧q is coarser than both p and q, and any partition that is coarser than both p and q is coarser than p∧q.

If p is a partition of S and X is a subset of S, then the projection of p on X is the partition project(p,X) that consists of all sets of the form T ∩ X, where T is in p, whenever T ∩ X is nonempty. If p is a partition of {1, . . . , n} and q is a partition of {1, . . . , m}, then p+q is the unique partition of {1, . . . , n+m} such that i and j lie in the same component if and only if either i and j lie in the same component of p, or i−n and j−n lie in the same component of q.

Type Tuple Constraints

A particular method showing how a record (also called a tuple) of values can be approximated via a record (or tuple) of types is now discussed. Furthermore, it is shown how the approximation can be made more precise by adding equality constraints. These equality constraints list what fields have equal values in a tuple of types. The types appearing in a record of types are understood to be part of a type hierarchy. This can be either a type hierarchy supplied by the user, or a type hierarchy created from an arbitrary entity hierarchy using the construction detailed above.

Figure 11:
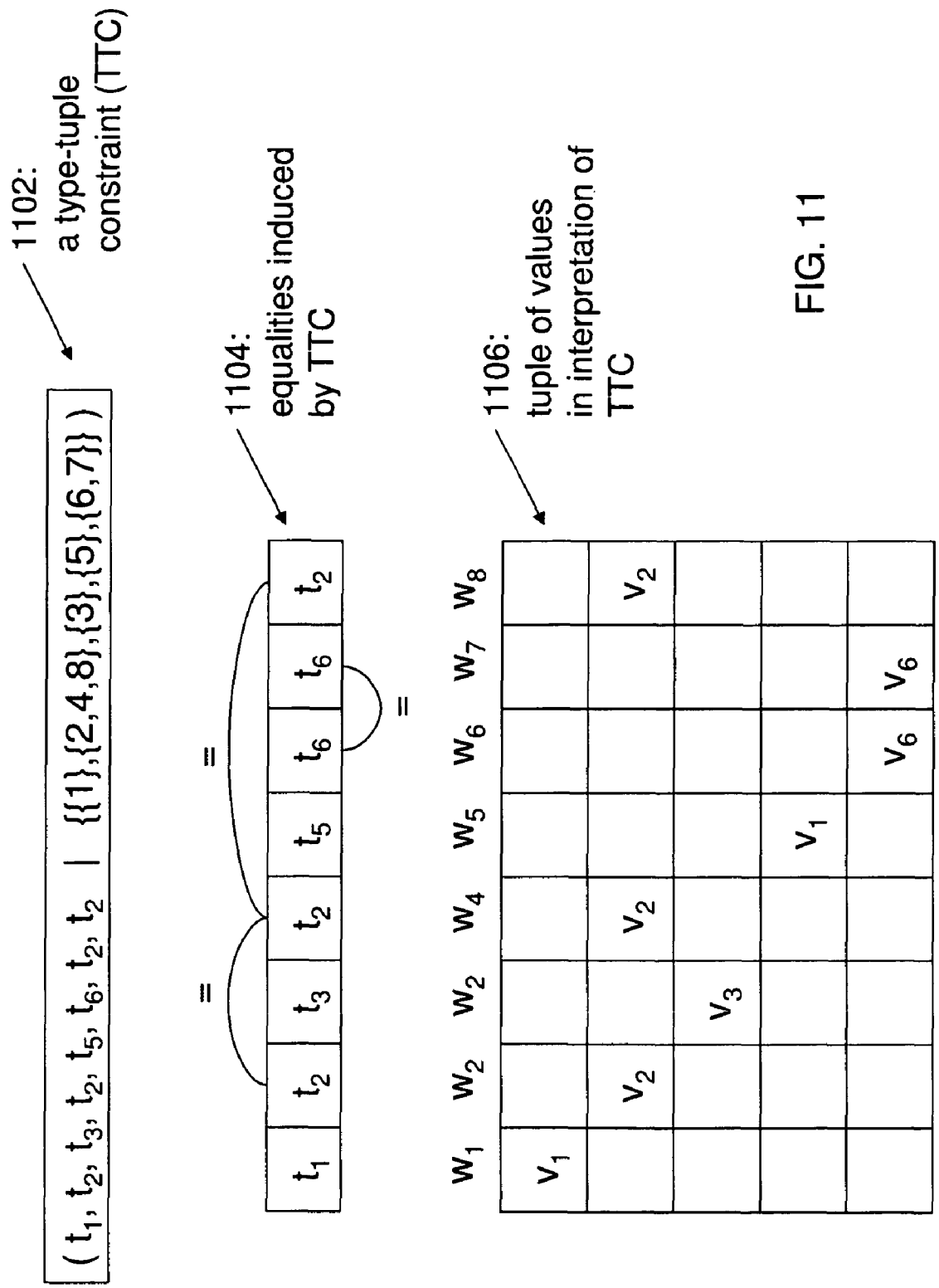
FIG. 11 illustrates the notion of TTCs (type tuple constraints), a novel data structure in the type inference algorithm according to one embodiment of the present invention.

A type tuple constraint (TTC) describes a tuple type, that is, the types of each of the fields in a relation. Furthermore, a TTC adds equality constraints between fields to that tuple type. The general form of a TTC is $(t_1, \ldots, t_n|p)$ where each $t_i$ is a type, and p is a partition of the set $\{1, \ldots, n\}$. The interpretation of a TTC, written $[(t_1, \ldots, t_n|p)]$ is the set of tuples $(x_1, \ldots, x_n)$ where for each i, $x_i \in [t_i]$, and furthermore whenever i and j are in the same component of p, then $x_i=x_j$. Therefore a TTC records a particular combination of assignments of types to fields, together with equality constraints between fields. FIG. 11 illustrates these definitions with an example TTC (1102). The partition stipulates the equality constraints (1104). FIG. 11 also shows a tuple $(w_1, \ldots, w_8)$ 1106 in the interpretation of the TTC 1102. In that tuple 1106, components $w_1$ and $w_5$ are accidentally equal, whereas the equality constraints in 1104 dictate that $w_2=w_4=w_8$ and $w_6=w_7$.

A TTC is degenerate if any of its component types is ⊥. The TTC Top (re-using the Top notation, so not to be confused with the type Top) is defined as (Top, . . . , Top|p) where p={{1}, . . . , {n}} where n is the number of fields. The set of fields depends on the context in which Top is used; this context is omitted for the sake of brevity. The subtype order <: is extended to TTCs as follows:

$(t_1, \ldots, t_n|p) <: (s_1, \ldots, s_n|q)$ if $t_i <: s_i$ for each i, and in addition p is coarser than q.

Figure 12:
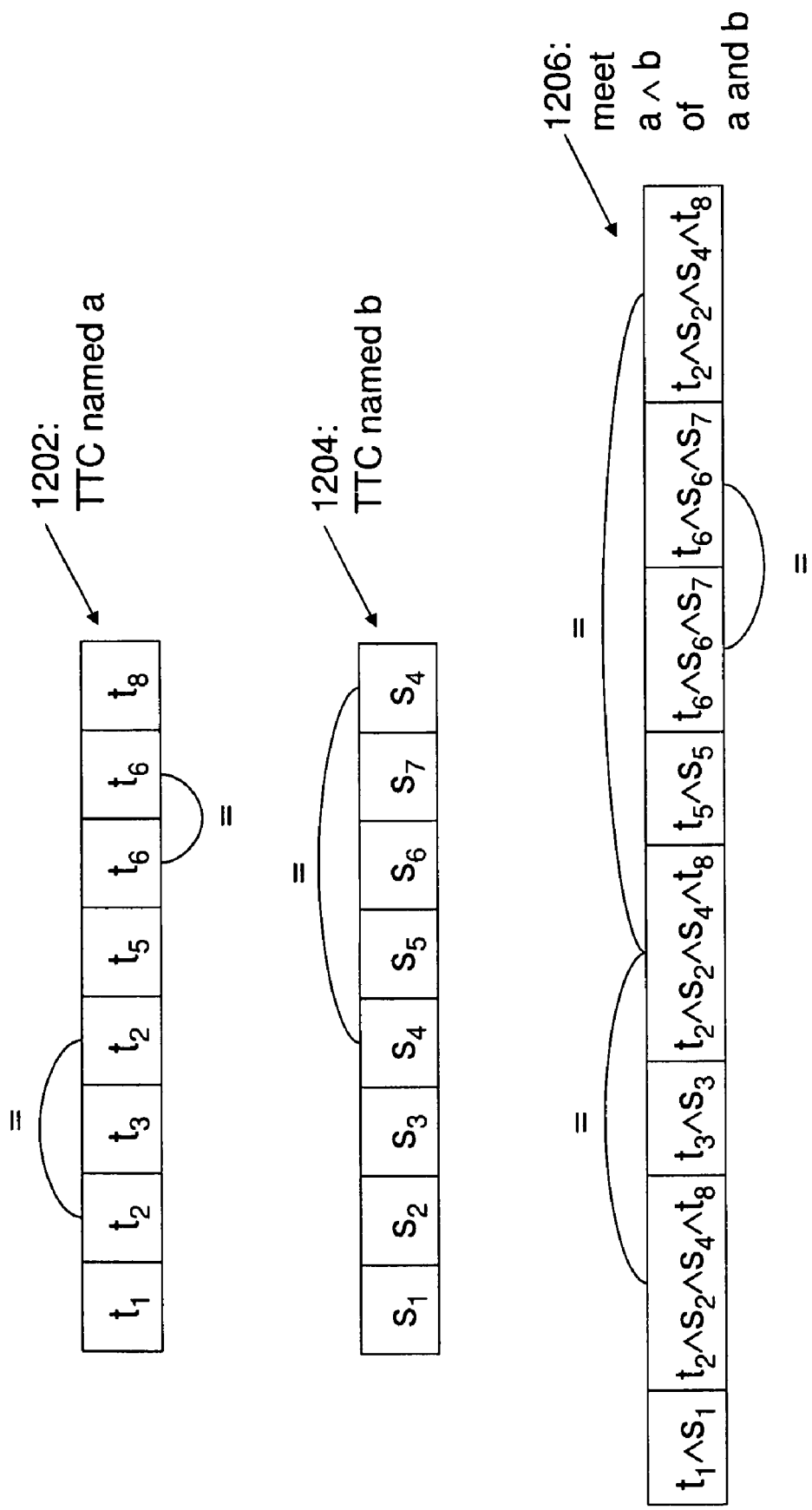
FIG. 12 exemplifies the meet operation on TTCs according to one embodiment of the present invention.

A number of procedures for combining TTCs used in the invention are defined. If $(t_1, \ldots, t_n)$ is a tuple of types, and p is a partition, then $(t_1, \ldots, t_n) \otimes p$ is the TTC $(s_1, \ldots, s_n|p)$, where $s_i$ is the meet of all $t_j$ such that i and j lie in the same component of p. If $a=(t_1, \ldots, t_n|p)$ and $b=(s_1, \ldots, s_n|q)$ are TTCs, then the meet of a and b, written a∧b, is the TTC $(t_1 \wedge s_1, \ldots, t_n \wedge s_n) \otimes (p \wedge q)$. The definition of the meet operation is illustrated in FIG. 12, which shows two example TTCs (TTC a 1202 and TTC b 1204), together with their meet (meet 1206 a∧b of a and b). Note in particular that the second component of meet 1206 is the meet not only of $t_2$ and $s_2$, but also of all the other components that are expected to be equal according to TTC a 1202 and TTC b 1204, namely $s_4$ and $t_8$. If the TTC a is unary, say a=(t |p), the complement of a is defined to be ¬a =(¬t |p). In this case p={{1}}.

Typings

Figure 13:
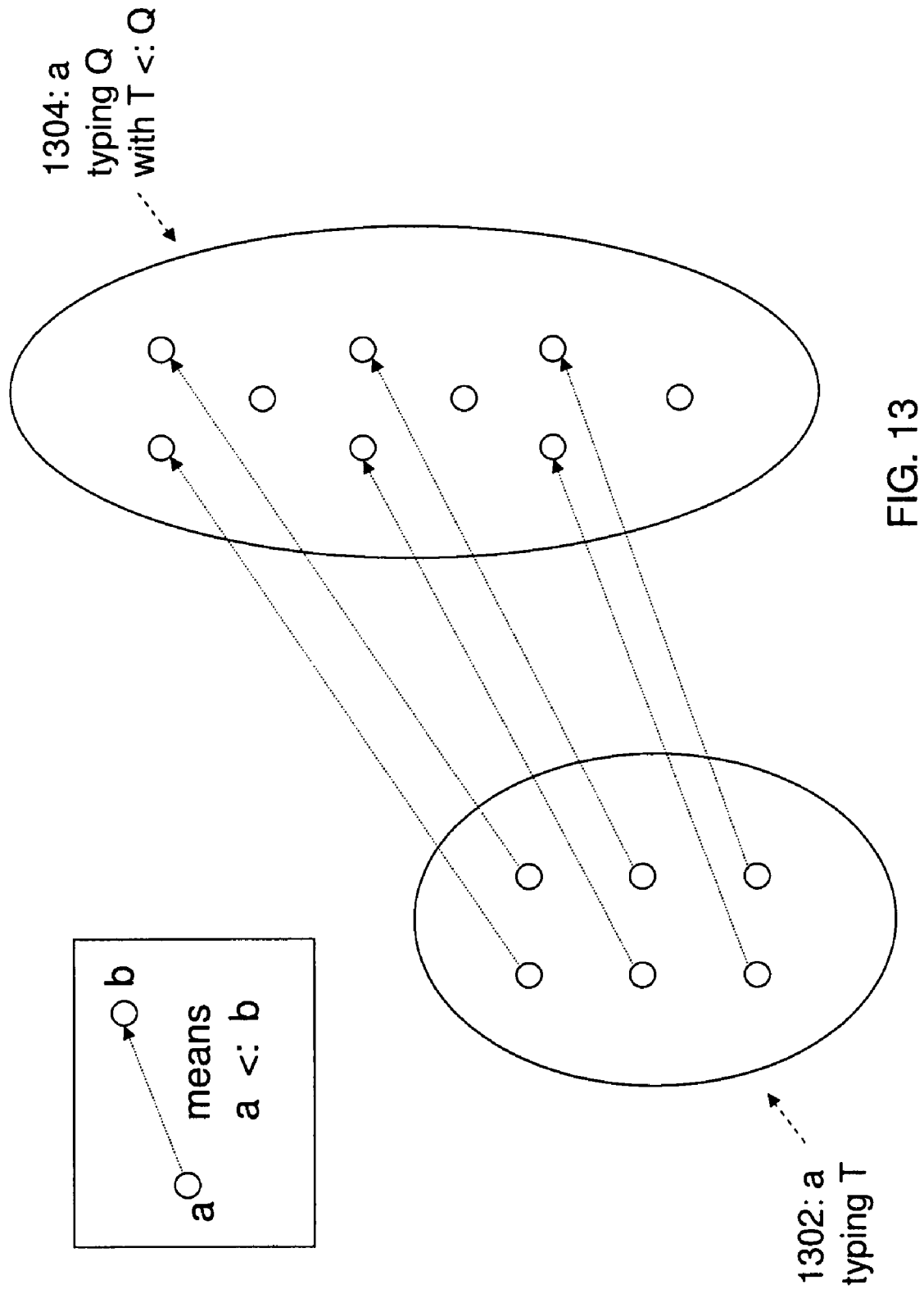
FIG. 13 illustrates the order relation on typings (which are sets of TTCs) according to one embodiment of the present invention.

The derived type of a query (or part of a query) is called a typing. A typing is a set of TTCs, representing any value that is described by at least one of the member TTCs. No TTC in a typing may be degenerate. The interpretation of a typing is the union of the interpretations of the TTCs contained in the typing. A typing is empty if it contains no TTCs. The empty typing represents a relation that is empty regardless of the database contents. The subtype order <: is extended to typings as follows: T<:Q (where T and Q are typings) if for any TTC a in T, there is a TTC b in Q such that a<:b. The definition of this order is illustrated in FIG. 13 where a typing T 1302 and a typing Q 1304 with T<:Q are shown.

The operation of complement on typings is defined as follows. If a typing only contains one TTC, and that TTC is unary, the complement of the typing contains the complement of the TTC in the original typing. In all other cases, the complement of a typing is {Top}. Typings are approximations of query results, and when for two approximations T and Q, it is the case that T<:Q holds, then it can be said that "T is a more precise approximation than Q".

Inferring Query Types: One Embodiment

Figure 14:
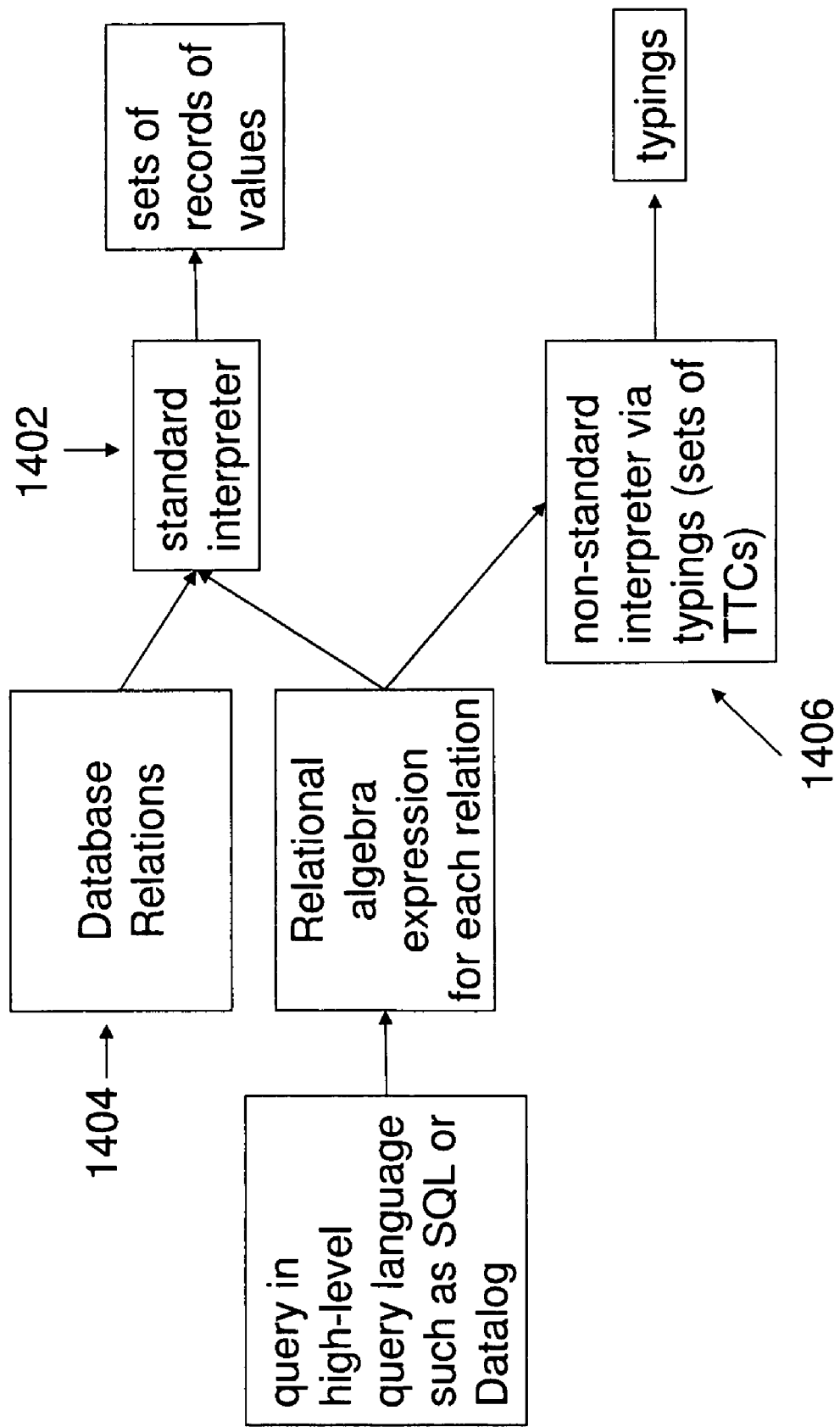
FIG. 14 shows how query types are inferred by a non-standard evaluation method according to one embodiment of the present invention.

The procedure outlined below computes a typing for each part of a query, in a way that guarantees that the actual relation computed by the query is a subset of the interpretation of its typing, for any database. An overview of the process is shown in FIG. 14. FIG. 14 shows a modification to the way queries are evaluated that the inventors have found to be advantageous. Queries are usually evaluated by first translating the queries to relational algebra expressions, and then interpreting those expression (step 1402), using the database relations (Step 1404) in terms of sets of records of values. Instead of using this conventional interpretation of relational algebra expressions, a novel non-standard interpretation is used by the compiler 0106 (step 1406) such that typings are given to each expression.

The types of queries are derived from the structure of these queries. The construction of relational algebra expressions is given below:

```
RA    ::=
      false
      | true
      | R                    (a relation R in the database)
      | P                    (a defined relation P)
      | RA ∩ RA
      | RA ∪ RA
      | not(RA)
      | RA × RA
      | project(RA, S)       (projection on a set S of fields)
      | select(RA, X=Y)      (selection by field equality)
```

Each of the different ways of combining relational algebra expressions is referred to as a relational algebra operator.

Faithfulness

A relational algebra expression is considered faithful if, informally, the interpretation of the typing inferred for it by the method of the present invention is always guaranteed to coincide with the set of values represented by that relational algebra expression. More formally: The literals true and false are faithful.

A relation R in the database is faithful if it is unary, and if its single variable is annotated as being faithful in the database schema. An intersection is faithful if both its subexpressions are faithful. A union is faithful if both its subexpressions are faithful, and moreover the underlying type hierarchy has faithful joins. A negation is faithful if its subexpression is faithful, and moreover the underlying type hierarchy has faithful complements. A cross product is faithful if both its subexpressions are faithful. A projection is faithful if its subexpression is a reference to a database relation R, and moreover the set of projection fields S only contains one field, which is annotated as being faithful in the database schema. A selection is not faithful. A reference to a defined relation P is faithful if the relational algebra expression defining P is faithful. No other expressions are faithful.

Computing Typings for Relational Algebra Operators

For each kind of relational algebra expression, a procedure for deriving the typing to this expression is given, which receives the typings of its parts. Later a procedure is given for computing typings for arbitrary relational algebra expressions. The procedure gives a new meaning in terms of typings to each of the above relational algebra operators: the usual meaning of these operators is in terms of sets of tuples of values, and instead in one embodiment, these are read as operators on typings. Giving a new meaning to each operator is called an interpretation of relational algebra, and each operator is interpreted in terms of typings rather than sets of tuples.

The typing of false is Ø.

The typing of true is {Top}.

For a relation R in the database, if the schema of R is $R(x_1: t_1, \ldots, x_n: t_n)$, then the typing of R is $\{(t_1, \ldots, t_n|p)\}$, where $p = \{\{1\}, \ldots, \{n\}\}$.

The typing of a reference to a defined relation P is the derived typing for P.

To compute the typing of $R_1 \cap R_2$, first compute the typing of $R_1$, say T and the typing of $R_2$, say S. The typing of $R_1 \cap R_2$ consists of all TTCs of the form a∧b, where a lies in T and b lies in S, such that a∧b is not a degenerate TTC.

To compute the typing of $R_1 \cup R_2$, first compute the typing of $R_1$, say T and the typing of $R_2$, say S. The typing of $R_1 \cup R_2$ is the union of T and S.

The typing of not(R) is the complement of the typing of R.

To compute the typing of $R_1 \times R_2$, first compute the typing of $R_1$, say T, and the typing of $R_2$, say S. The typing of $R_1 \times R_2$ consists of all TTCs of the form $(t_1, \ldots, t_n, s_1, \ldots, s_m|p+q)$, where $(t_1, \ldots, t_n|p)$ lies in T and $(s_1, \ldots, s_m|q)$ lies in S.

To compute the typing of project(R, S), first compute the typing of R, say T. Given a TTC $a=(t_1, \ldots, t_n|p)$, the projection of a on S is the TTC $(t_{i_1}, \ldots, t_{i_k}|project(p,S))$, where $i_1, \ldots, i_k$ enumerates S in increasing order. The typing of project(R, S) consists of the projection on S of all TTCs in T.

To compute the typing of select(R, $X_i=X_j$), first compute the typing of R, say T. The typing of select(R, $X_i=X_j$) is computed as the typing of R ∩ S, where S is a relation with typing {(Top, ..., Top|p)} and p is the partition equating i and j, and nothing else.

Simplifying Typings

In some circumstances, complex typings may be represented by simpler, but equivalent, typings. This allows the type inference procedure to be implemented more efficiently. Suppose that types have faithful joins. This is not required in the basic type inference algorithm, but is used for efficient implementation. If T is a typing such that all TTCs in T consist of a single type (this represents a relation with a single field), then T is equivalent to the typing containing a single TTC whose type is the join of all the types appearing in TTCs in T. There are no equality constraints as T represents a relation with a single field. This strategy can be applied for appropriate typings by applying the transformation described above when computing union and projection on typings.

Computing Typings for Programs

The above procedure allows the typing of an expression of relational algebra to be computed, whenever the typings of its subexpressions have been computed. Now, a procedure for computing the typing of any subexpression of a program is given. Unlike the previous section, which discussed this specific embodiment, the procedure discussed below is an instance of the framework of abstract interpretation.

A program is a set of relations, each of which is defined in the following form, where p is the name of the relation, the Xi are the fields of the relation, and E is an expression of relational algebra (the body of p):

$p(X_1, \ldots, X_n) :- E$

An expression E depends on p if E refers top or to some other relation q whose body depends on p. An expression is recursive if it depends on the relation in which it is defined. A relation p depends on q if the body of p depends on q. Programs are subject to the following standard constraint, called stratification: no negated expression not(E) can be recursive. The inference procedure outlined below is only guaranteed to succeed for programs that meet the stratification constraint.

Figure 15:
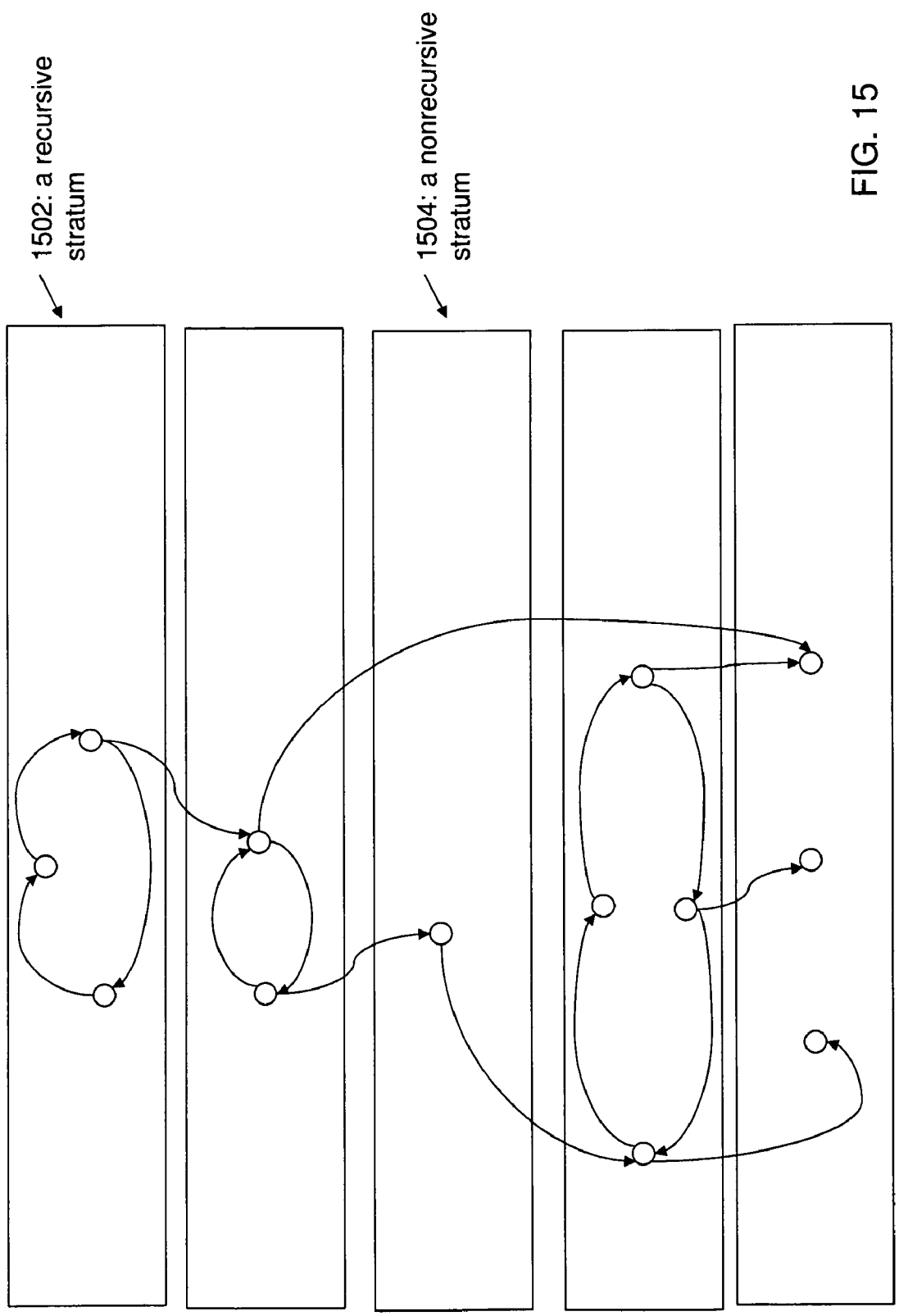
FIG. 15 depicts how strata in the query program may depend on each other.

To compute types, first collect the maximal connected component of the dependency relation between predicates. This may be obtained by constructing the graph of the dependency relation, and applying methods known to those skilled in the art to find its strongly-connected components. Each such component is called a stratum. A stratum s depends on another stratum s' if some relation in s depends on some relation in s'. Inference proceeds bottom-up: before a stratum is evaluated, all the strata it depends on are expected to have been evaluated. This can be achieved by computing a topological sort of the dependency graph between strata, which is guaranteed to be acyclic. Dependencies between strata are illustrated in FIG. 15 wherein a recursive stratum 1502 and a non-recursive stratum 1504 are shown.

For each stratum, evaluation proceeds as follows.

If a stratum consists of a single predicate p, and p does not depend on itself, the typing of p can be obtained by applying the construction given above to the body of p. The typing of p is just that of its body. Otherwise, the typing of the stratum can be computed by fixpoint iteration. Suppose that the relations in the stratum are $p_1, \ldots, p_n$, and let $T_1, \ldots, T_n$ be the corresponding typings. Initially set each $T_i$ to the empty typing. Then, evaluate the typings of the bodies of the relations in the stratum, using $T_i$ as the typing of $p_i$ wherever necessary (that is, for recursive uses of $p_i$). This yields typings $T_1', \ldots, T_n'$. If $T_i = T_i'$ for each i then the $T_i$ are the typings of the $p_i$. Otherwise, set $T_i$ to $T_i'$ for each i and repeat this procedure.

The above procedure is guaranteed to terminate for all strata. Once all strata in the program have been evaluated, each relation in the program has been assigned a typing. Furthermore, each expression in the program has been assigned a typing, which may be recorded for error checking and optimization purposes.

Inferring Query Types: Another Embodiment

Another embodiment of inferring types for relations is discussed, namely by simply executing the query on a specially constructed database, where the relations in the database are constructed in terms of types, and then performing a post-processing step on the result. In terms of FIG. 14, this means that an especially constructed database for database relations 1404 is substituted in place of the typical database, and as a consequence the conventional evaluator (block 1402) performs the function of the non-standard one (block 1406).

First, the contents of the database are described. Let N be the highest parity of any relation in the program. For each type t, the earlier introduction of the interpretation [t] of t is instantiated by:

$[t] = \{s | s <: t \wedge s \neq \bot\} \times \{1, \ldots, N\}$ and for any relation $P(x_1: t_1, \ldots, x_n: t_n)$ in the database, define the set [P] by $[P] = [t_1] \times \ldots \times [t_n]$ It is easily checked that the above definitions of [t] and [P] satisfy the earlier requirements on interpretations. Now evaluate the program via the normal evaluation of stratified Datalog programs, using the set [P] for occurrences of relation P, and write [R] for the set of tuples computed for a relation expression R.

The typing of R can now be read off as $\langle R \rangle = \{(s_1, \ldots, s_n | p(k_1, \ldots, k_n)) | ((s_1, k_1), \ldots, (s_n, k_n)) \text{ in } [R]\}$ where i and j lie in the same component of the partition $p(k_1, \ldots, k_n)$ if and only if $k_i = k_j$.

It can be proven that the two different methods of inferring query types yield equivalent results. Furthermore, those results are optimal, in the sense that there is no tighter typing of the relations that is also sound.

Data structures for representing TTCs and Typings

The above description of the invention is in general terms, permitting many different embodiments by choosing different data structures for representing TTCs and typings. In one embodiment of the invention, TTCs are implemented directly as tuples of types plus a partition to represent equalities, and typings are represented as sets of TTCs. This is perhaps the most straightforward data structure for implementing the above operations. There are however other ways of representing typings and TTCs in a data structure; an example is described in what follows.

One could think of a TTC as a Boolean formula, which asserts that some fields are equivalent, and for each field it asserts what type the field has. In this view, a typing is also a Boolean formula, namely the disjunction of all the TTCs it contains. Put differently, the approximation obtained by type inference (a set of records of types) is itself represented as a Boolean formula.

To represent TTCs as Boolean formulae, a special set of designated propositional variables $C_1, \ldots, C_n$ are introduced, where n is the maximal arity of any relation in the program or database. Each of these designated variables corresponds to a field. The TTC $(t_1, \ldots, t_m | p)$, where the $t_i$ are propositional types, is represented as the logical formula obtained by conjoining the propositions $C_1 \Rightarrow t_1, \ldots, C_m \Rightarrow t_m$, as well as the logical equivalences $C_i \Leftrightarrow C_j$ whenever i and j are in the same component of p. The logical formula obtained in this manner is known as a propositional TTC.

The subtyping relation on propositional TTCs can then be given by logical implication, and the meet operation is just logical conjunction. One skilled in the art will see that the other operations in the type inference algorithm have similarly simple implementations on propositional TTCs, once the above non-obvious representation of TTCs via Boolean formulae is known.

A typing is represented by the disjunction of the Boolean formulae representing the TTCs in the typing. The corresponding Boolean formula is referred to as a propositional typing. The subtype order on propositional typings is given by logical implication. Again appropriate implementations of the requisite operations on typings can be devised by one skilled in the art once the non-obvious representation of TTCs via formulae is known.

In a particular embodiment, the TFB, the propositional typings, TTCs and types are converted into a form suitable for processing by SAT-solvers, theorem provers or similar logic manipulation tools. Their power is then leveraged to perform the necessary operations during type inference, error checking and optimization. In another embodiment, the TFB, the propositional typings, TTCs and types are represented by binary decision diagrams, as described below.

Binary Decision Diagrams

Figure 16:
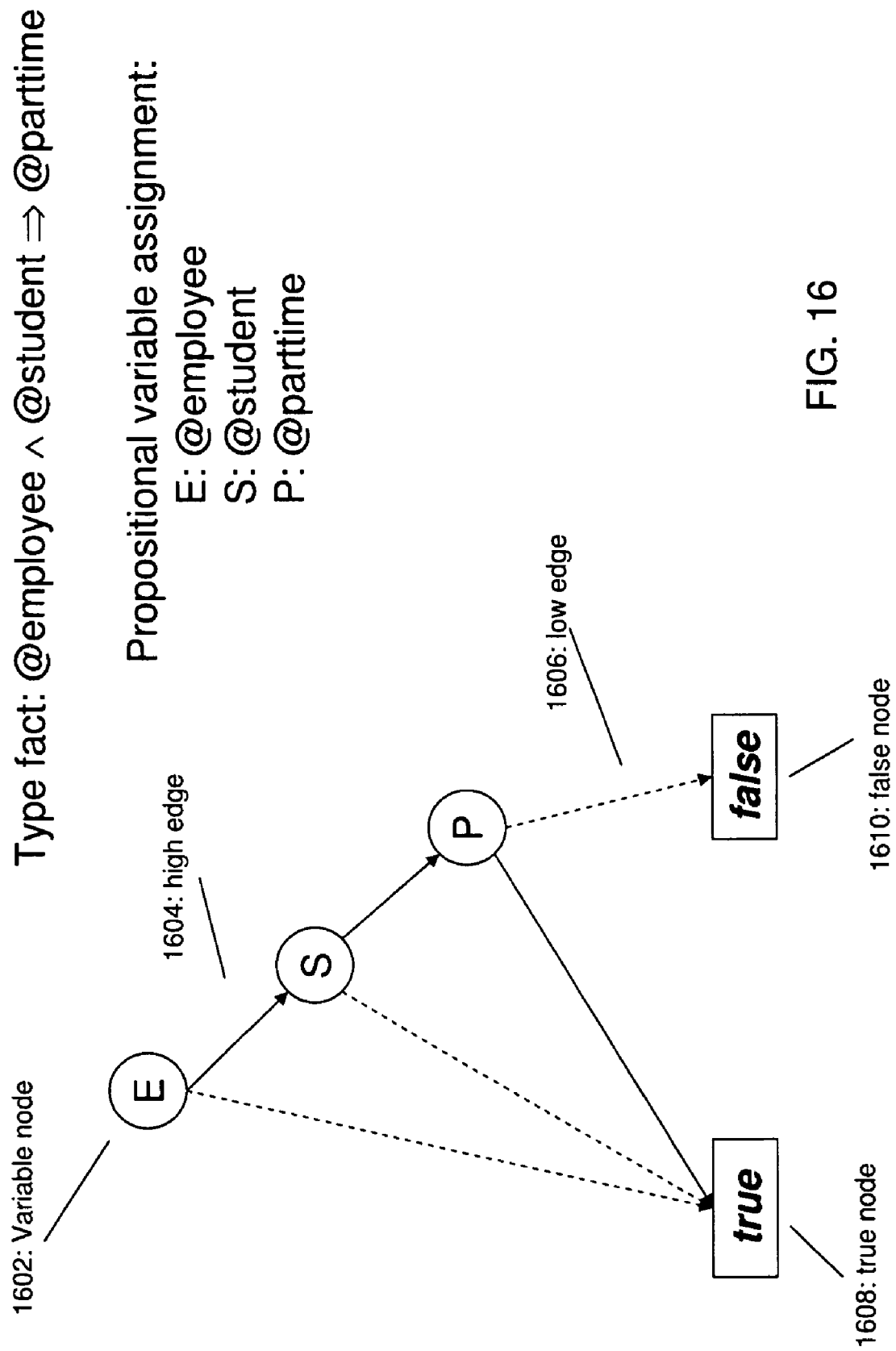
FIG. 16 illustrates binary decision diagrams, as used for representing type facts according to one embodiment of the present invention.

A binary decision diagram (or BDD, see FIG. 16) is a representation for Boolean formulae that is known to those skilled in the art. In particular, it introduces a numbering of the propositional variables that are used. The choice of numbering can have significant effects on the performance and space efficiency of the BDD. In particular, FIG. 16 is a BDD for type fact: @employee ∧ @student=>@parttime with propositional variable assignment: E: @employee; S: @student; and P: @parttime. The BDD of FIG. 16 shows a variable node 1602, a high edge 1604, a low edge 1606, a true node 1610, and a false node 1610.

Those skilled in the art will appreciate that a good choice of numbering for the propositional variables is indispensable for the efficient evaluation when using a BDD representation. This is illustrated in FIG. 17 for the logical formula (A ∧ B) ∨ (C ∧ D). The first numbering 1: A, B, C, D shows an efficient BDD with 4 nodes 1702. The second numbering 2: A, C, B, D shows an inefficient BDD with 7 nodes. In what follows, an embodiment for choosing a good numbering is detailed.

The key insight is to deduce dependencies between propositional variables from the type facts stated about entity types in the database schema (that is, in the TFB), and to use those dependencies in computing a good numbering. In particular, the subtyping relation between entities as well as other type-related annotations given by the designer of the database schema are analyzed, and the result of this analysis is used to guide the order (and hence the numbering) of propositional variables corresponding to entities.

In one embodiment, two entities are considered to be co-constrained if one is a subtype of the other, or if they occur in the same logical constraint arising from an annotation on the database schema. The assignment of variables then proceeds to find a numbering that places co-constrained variables as close together as possible. In other words, the order of BDD variables is determined by placing variables that are mentioned together in a single type fact close together in the variable order.

In another embodiment, the graph induced by the relation of co-constrainedness is analyzed for strongly connected components (components where any two vertices are connected by at least two distinct paths); the numbering then proceeds in such a way as to choose smaller strongly connected components first, and put the variables of any particular strongly connected component in a block. In other words, a graph of dependencies between variables is deduced from the stated type facts; strongly connected components in that graph are identified, variables in the same strongly connected component are placed close together in the variable order, and strongly connected components that contain few variables are placed before larger strongly connected components in the variable order.

In another embodiment, the TFB is analyzed by computing a cost metric for variable orders (for instance by computing a notion of size), and that metric is used to select a variable order of minimum cost among multiple alternative variable orders.

Checking for Type Errors

The above type inference procedure can be used directly to predict whether the set of results of a query is empty, regardless of the contents of the relational data source. The query is empty when it has an empty set of results for all relational data sources that confirm to the given schema. In one embodiment of the present invention, when the system encounters such an empty query, it warns the creator of the query, and the system indicates the likely causes of emptiness, for instance by printing an error message.

Now, a refinement of this type-checking procedure is described that catches more potential errors. In the following query, the creator intended to determine whether cycle x has wheel y. However, an error has crept in: the wheel of a unicycle is the third field of the unicycle relation, not the second.

```
hasWheel(x, y) :-
    wheel(y,_,_) , (bicycle(x,y,_,_,_) ;
    bicycle(x,_,_,y,_) ; unicycle(x,y,_,_)).
```

The embodiments discussed so far do not directly detect errors of this kind: each part of the query makes sense on its own, and no part has an empty typing. However, when considering unicycle(x,y,_,_) in the context of wheel(y,_,_), it becomes clear that the latter is erroneous.

To find such errors, a search for empty parts of a query is performed that traverses the abstract syntax tree representing the right-hand side of each query procedure, thus visiting each part of the query. While doing so, in one embodiment, a stack of typings (approximations of the corresponding relations) is maintained that represents the context of the query part that is currently being visited. When entering a new query part, the conjunction of the typing derived for that part with the top of the stack is taken, and that new context is pushed on top. When finished visiting the query part, that conjunction is popped. If the typing on the top of the stack is empty, an error is reported.

Figure 18:
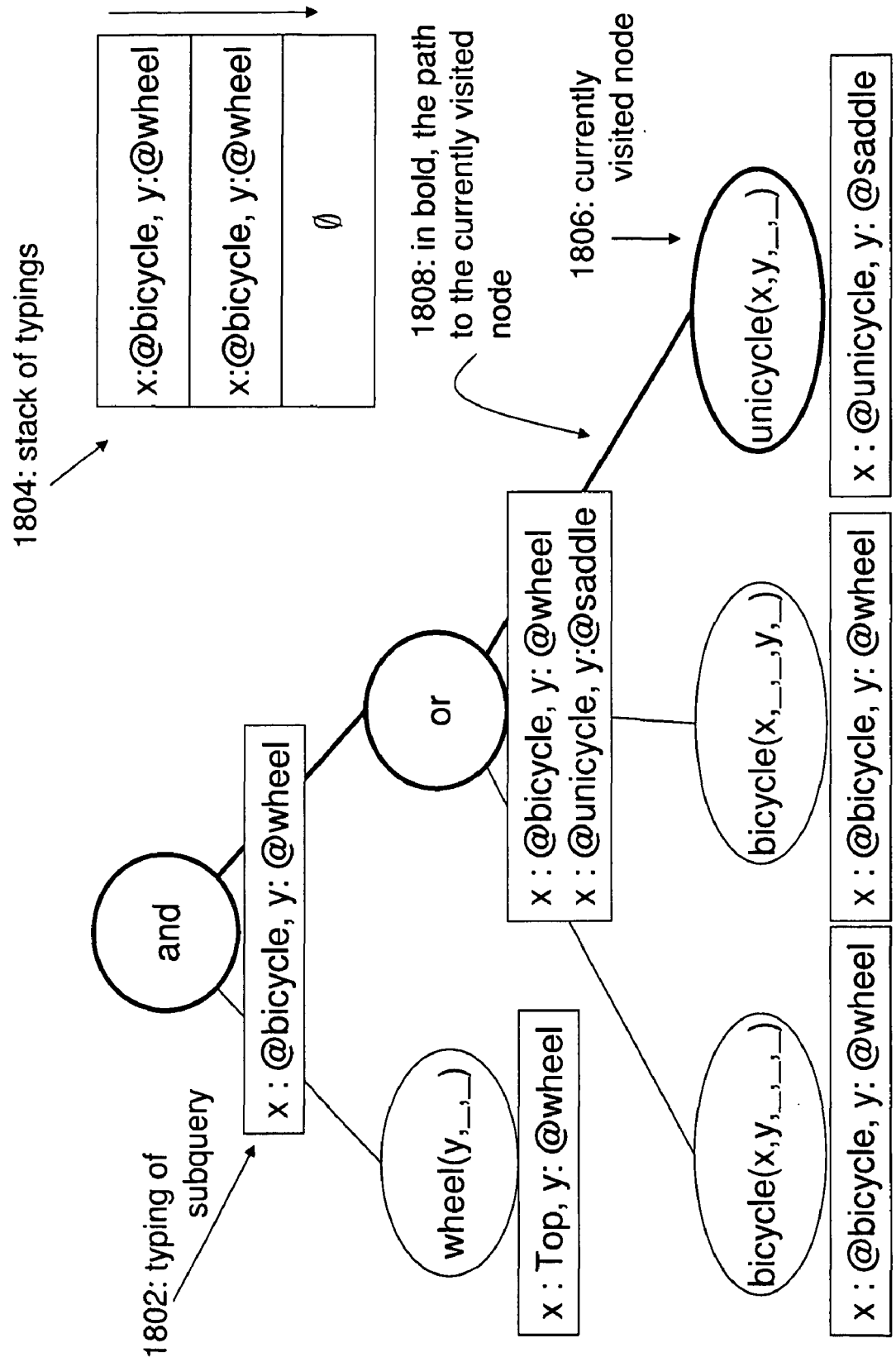
FIG. 18 illustrates how to use typings and a stack of contexts to find errors in a query according to one embodiment of the present invention.

FIG. 18 illustrates that process on the above example: the typing derived for the whole right-hand side is {(x: @bicycle, y:@wheel)} 1802, and there are no equality constraints. The traversal is started by pushing that on the stack of typings 1804. Next, the query part (wheel(y,_,_)) is visited. The conjunction with the context is unchanged, and a duplicate simply pushed onto the stack. Now (bicycle(x,y,_,_,_); bicycle (x,_,_,y,_); unicycle(x,y,_,_)) is visited. The typing of this query part is {(x: @bicycle, y:@wheel), (x: @unicycle, y: @saddle)}. Taking the conjunction with the top of the stack gives {(x: @bicycle, y: @wheel)}. Visiting (bicycle (x,y,_,_,_)) and (bicycle(x,_,_,y,_)) again only duplicates the typing on top of the stack.

Finally, the query part (unicycle(x,y,_,_)) is visited. The typing of this query part is {(x: unicycle, y: @saddle)}. Taking the conjunction with the top of the stack (which is {(x: @bicycle, y: @wheel)}) yields the empty typing because the meet of @saddle and @wheel is empty. This is illustrated in by the list of currently visited nodes 1806 of FIG. 18. Consequently an error is reported. The above method of finding empty subqueries is effective, but sometimes it does not accurately pinpoint the cause of an error. To illustrate this, consider

```
hasTube(x, z) :-
    unicycle(x,y,_,_),tire(t,z), wheel(y,t,_) .
```

The whole right-hand side of this query is empty. It would be unhelpful, however, to report the whole right-hand side as being in error. The cause of emptiness is that unicycle(x,y,_,_) and wheel(y,t,_) assign incompatible types to y, namely @saddle and @wheel respectively.

To accurately determine the likely cause of such problems, whenever a conjunction of a set X subqueries is found to be empty, the type checking algorithm iterates over all subsets of X, trying to find one that has the property that its typing is empty, but all its subsets have a non-empty typing. In the above example, that would correctly attribute the error to the pair of subqueries (unicycle(x,y,_,_)) and (wheel(y,t,_)). In summary, when an empty part of a query consists of a conjunction of other parts, a likely cause of emptiness is determined by finding a smallest set of query parts that have a conjunction that is itself empty.

Type-Based Optimizations

The type inference algorithm also allows queries to be optimized, and in particular by specialising query procedures to the context in which they are called. A query that contains calls to other query procedures is considered, and the approximation by typings is used to optimize these called procedures, This optimization is performed by eliminating query parts that return an empty set of results in the context where they are called, regardless of the contents of the relational data source.

To illustrate this, consider a minor variation of the query discussed earlier as an example of type-checking:

```
hasComponent(x,y) :- bicycle(x,y,_,_,_) ;
  bicycle(x,_,_,y,_) ; unicycle(x,y,_,_).
hasWheel(x, y) :- wheel(y,_,_) , hasComponent(x,y).
```

In this case, no error should be reported, as it might be that hasComponent(x,y) is used elsewhere, in a position where the disjunct unicycle(x,y,_,_) is useful, although it is clearly not useful when hasComponent(x,y) is used in the context of wheel(y,_,_). For example, the following additional use of hasComponent could occur in the query:

```
hasComponent(x,y) :- bicycle(x,y,_,_,_) ;
  bicycle(x,_,_,y,_) ; unicycle(x,y,_,_).
hasSaddle(x, y) :- @saddle(y) , hasComponent(x,y).
```

When hasSaddle(x,y) is evaluated, the bicycle parts of hasComponent are useless. Therefore it is desirable to optimize the program by specializing hasComponent to the contexts where it is called. This process is called type specialization, and its result on the above example is

```
hasComponent1(x,y) :- bicycle(x,y,_,_,_) ; bicycle(x,_,_,y,_) .
hasWheel(x, y) :- wheel(y,_,_) , hasComponent1(x,y).
```

To achieve such specialization, the call graph of the original query O is searched. The call graph of O is a graph that has query procedures as its nodes, and there is an edge from p to q if p calls q. The original query O is used to evaluate is the root of the call graph. More specifically, this search of the call graph is performed as follows. Assume that the original query is hasWheel(x,y). The right-hand side of its defining clause is traversed, maintaining a stack of approximations of a context where the procedure is being used (in the same way as the type-checker described earlier). However, each time a call to another query (in the above example, hasComponent) is encountered, the right-hand side of that query in its calling context is processed, by creating a new context that is the conjunction of the approximation of the call site and the procedure body. This new context is pushed onto the stack.

Figure 19:
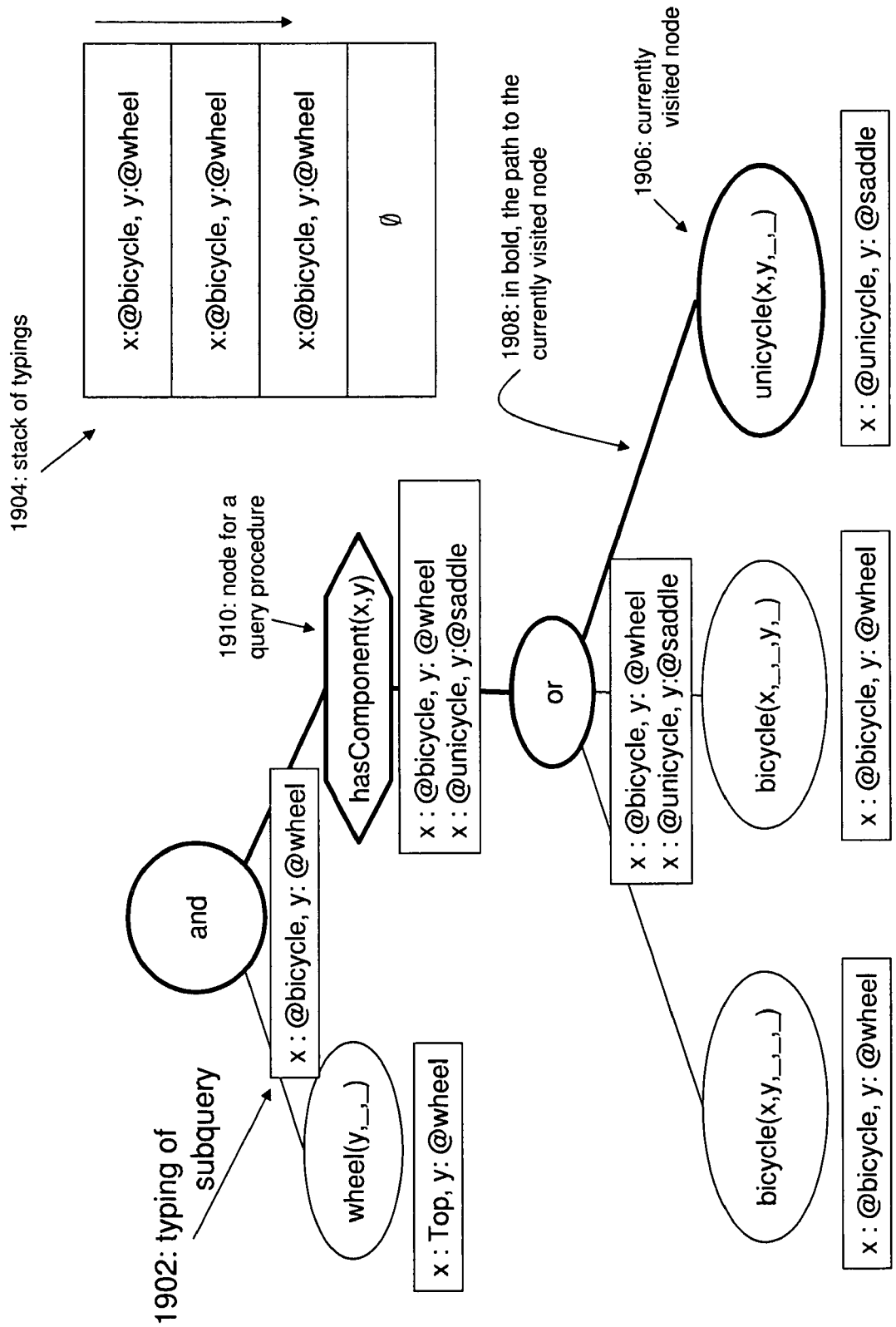
FIG. 19 illustrates the process of type specialization according to one embodiment of the present invention.

This process of type specialization is illustrated in FIG. 19. With each node of the abstract syntax tree, the typing corresponding to that relation expression 1902 is depicted. The stack of contexts 1604 and it displays the state when visiting node 1906. In the above example, when starting from has-Wheel(x,y), and the query part unicycle(x,y,_,_) is reached; it is observed that, in that particular calling context, that query part is empty, and so it can be eliminated.

A number of refinements are possible. For instance, to avoid generating too many different specializations of the same predicates, in one embodiment, it may be desirable to first compute the union of all calling contexts, and specialise with respect to that union rather than with respect to each calling context separately. This concludes our discussion of type specialization. Another type-based optimization is named type erasure. Type erasure eliminates unnecessary type tests from a query. A type test is unnecessary if the approximations (via typings) show that the value will have this type regardless of contents stored in the relational data source, or the approximations show that the value will not have the type.

To illustrate, consider the following specialized query for hasSaddle:

```
hasComponent2(x,y) :- unicycle(x,y,_,_).
hasSaddle(x, y) :- @saddle(y), hasComponent2(x,y).
```

There is no need to check that y is a saddle. To wit, the typing of hasComponent2 is {(x: @unicycle, y: @saddle)}, and from that it can be deduced that the type test @saddle(y) is superfluous in the definition of hasSaddle.

In general, whenever a type test @t(x) is encountered in a context where the typing already implies @t(x), such a test can be removed. The context can be computed via a tree walk that maintains a stack, as previously described under type checking and type specialization. In fact, in one embodiment type erasure can be applied more generally than just to type predicates like @saddle(x), namely to any relation R with the property that its approximation with a typing is exact. Such a relation R is said to be faithful. The precise definition of faithfulness was given above.

To have a simple test for faithfulness, in one embodiment a schema describing the database, fields whose interpretation coincides with the interpretation of their type are marked as faithful. An example of a faithful field is the first field (id of type @bicycle) in the bicycle relation. Now, any expression R defined in terms of faithful fields (but no other fields), and that contains no negation is a faithful expression. In other words, the check for faithfulness (exactness of the approximation by a typing) is carried out by checking that a query consists only of projections to fields that have been marked in the schema (of the relational data source) as coinciding with their declared type, no selections, and no negation.

To illustrate, type erasure can also eliminate the call wheel (y,_,_) in the query below, because wheel(y,_,_) is a faithful relation:

```
hasComponent1(x,y) :- bicycle(x,y,_,_,_) ; bicycle(x,_,_,y,_) .
hasWheel(x, y) :- wheel(y,_,_) , hasComponent1(x,y).
```

In cases such as the example above, where it can be deduced from the approximation of query results as a typing that a particular variable y has a given type t, the wording 'the approximation shows that y has type t' is used. Furthermore, when the approximation shows that y has type t and given that s ∧ t=⊥, it can be deduced that 'the approximation shows that y does not have type s'.

The type-based optimizations described above are particularly effective for the optimization of procedure calls in an object-oriented query language. In such an object-oriented query language, a call to a query procedure P may result in a number of different implementations of P being executed. These implementations are given in an object-oriented class hierarchy, with some implementations overriding others. Exactly which implementations are executed during query evaluation depends on the type of an object, and that is determined by type tests at runtime. Using the present invention, it is now possible to accurately predict what the outcome of those type tests will be, in advance of query execution. Those skilled in the art will recognize this as virtual method resolution, an important optimization for traditional object-oriented languages such as Java and C++. The various embodiments of the present invention enable, for the first time, virtual method resolution in the implementation of query languages.

Other Example Embodiments

The various embodiments of the present invention can be embodied in a system for creating queries that warns the creator of a query when any part of that query is empty, for example by printing an error message. Such warnings can also be given in other ways, for example by giving the creator of a query visual help on how queries may be combined by conjunction without creating empty parts in a combined query, by depicting compatible types with similar pictures in a user interface. Those pictures are 'similar' in the sense that it is easy to see whether queries can be combined by conjunction without creating an empty query part.

The various embodiments of the present invention can be embodied in any system for creating queries, where the queries are expressed in a language based on Datalog or a variant of Datalog. Candidates are object-oriented Datalog, Datalog with aggregate features, and more generally any visual or textual language whose surface syntax is not necessarily Datalog, but whose main constructs translate to Datalog.

Another particular embodiment of the invention is as part of a traditional relational database system: the queries are phrased in SQL, and the types in the inference algorithm are ordinary types defined in the SQL language. Another embodiment is in a relational object database, where the types are 'downward-closed' sets of classes in an object-oriented hierarchy. A set of classes is downward-closed if whenever class C is in the set, all subclasses of C are in the set as well.

The various embodiments of the present invention can also be employed as part of a system for implementing semantic web queries, where the types are so-called ontologies, and are represented as expressions in a description logic. Description logic formulae satisfy the constraints placed on the described notion of types. The queries could likewise be formulated in OWL (the Ontology Web Language), or one of its many variants.

The various embodiments of the present invention can be used in a more general system for knowledge representation and reasoning, where the types are representing sets of structured values such as trees or XML documents, which are described via an automaton. Such an automaton describes the set of values a type represents. The type inference methods are applicable whenever it is possible to compute the intersection of such automata, and there is an automaton describing the empty set, and an automaton describing the universal set.

In any of these embodiments, types could be further refined to approximate query results yet more precisely, for instance by keeping track of the fact that one field's values are expected to be smaller than another's, by modeling constants occurring in the program as types on their own (so for instance 3 is a subtype of int, and "abc" a subtype of string), and using formal grammars to model data values and their dependencies.

A traditional relational database is but one example of a relational data source (an entity that provides relations to be queried). The invention can also be used in an environment where the data source consists of a variety of multiple data sources, possibly including a relational database, a web service, a web page, or a file on hard disk.

Non-Limiting Hardware Examples

Overall, the various embodiments of the present invention can be realized in hardware or a combination of hardware and software. The processing system according to a at least one embodiment of the present invention can be realized in a centralized fashion in one computer system or in a distributed fashion where different elements are spread across several interconnected computer systems and image acquisition subsystems. Any kind of computer system—or other apparatus adapted for carrying out the methods described herein—is suited. A typical combination of hardware and software is a general-purpose computer system with a computer program that, when loaded and executed, controls the computer system such that it carries out the methods described herein.

An embodiment of the processing portion of the various embodiments of the present invention can also be embedded in a computer program product, which comprises all the features enabling the implementation of the methods described herein, and which—when loaded in a computer system—is able to carry out these methods. Computer program means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form.

Figure 20:
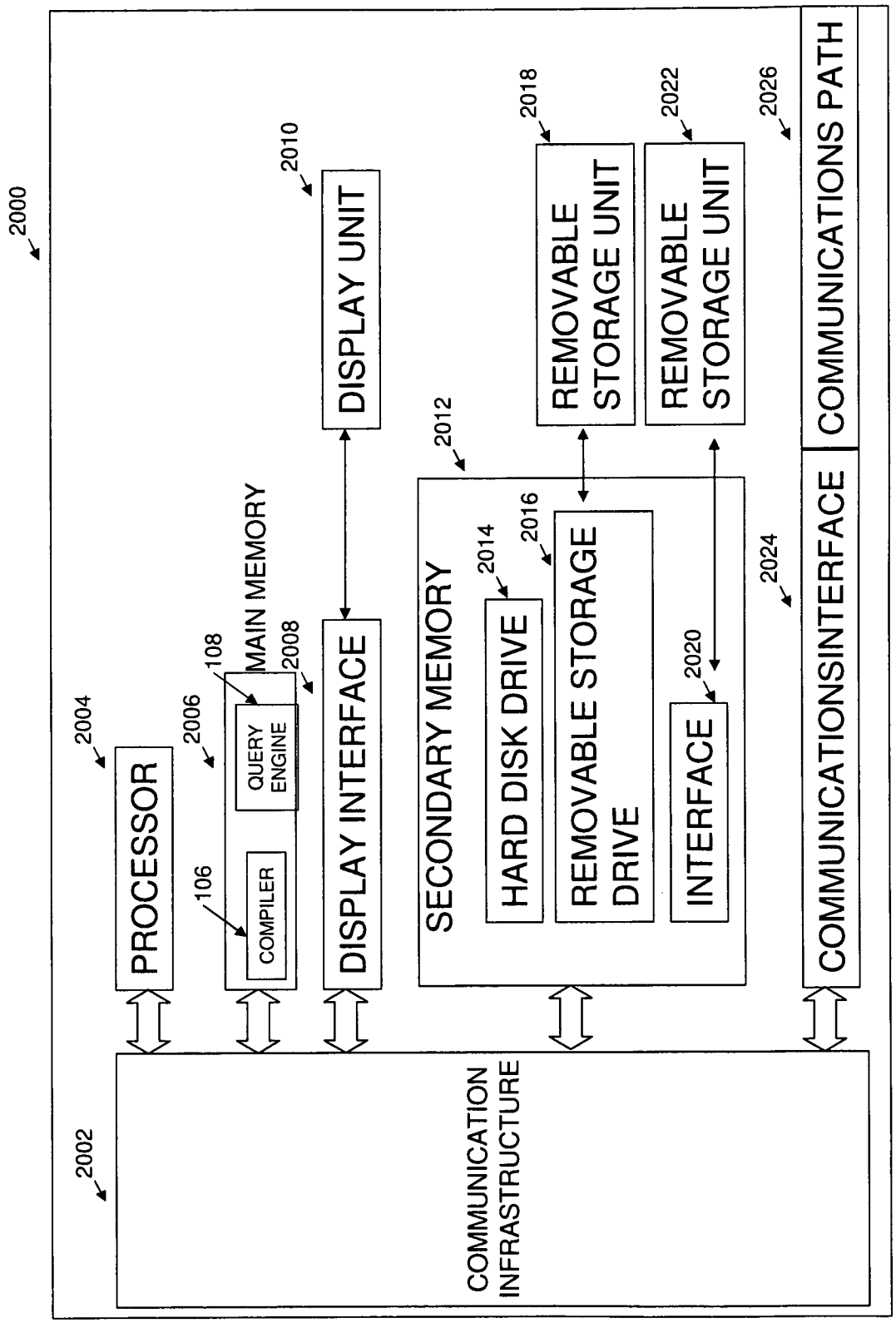
FIG. 20 is a block diagram of showing one example of a computer system useful for implementing the various embodiments of the present invention.

FIG. 20 is a block diagram of a computer system useful for implementing the software steps of the various embodiments of the present invention. Computer system 2000 includes a display interface 2008 that forwards graphics, text, and other data from the communication infrastructure 2002 (or from a frame buffer not shown) for display on the display unit 2010. Computer system 2000 also includes a main memory 2006, preferably random access memory (RAM), and optionally includes a secondary memory 2012. The main memory 2006, in one embodiment, comprises the compiler 0106, which performs the process discussed above for approximating queries over a relational data source for the purposes of optimization and error checking. The main memory 2006 can also include the query engine 0108 as well. The secondary memory 2012 includes, for example, a hard disk drive 2014 and/or a removable storage drive 2016, representing a floppy disk drive, a magnetic tape drive, an optical disk drive, etc. The removable storage drive 2016 reads from and/or writes to a removable storage unit 2018 in a manner well known to those having ordinary skill in the art. Removable storage unit 2018, represents a CD, DVD, magnetic tape, optical disk, etc. which is read by and written to by removable storage drive 2016. As will be appreciated, the removable storage unit 2018 includes a computer usable storage medium having stored therein computer software and/or data. The terms "computer program medium," "computer usable medium," and "computer readable medium" are used to generally refer to media such as main memory 2006 and secondary memory 2012, removable storage drive 2016, a hard disk installed in hard disk drive 2014, and signals.

Computer system 2000 also optionally includes a communications interface 2024. Communications interface 2024 allows software and data to be transferred between computer system 2000 and external devices. Examples of communications interface 2024 include a modem, a network interface (such as an Ethernet card), a communications port, a PCM-CIA slot and card, etc. Software and data transferred via communications interface 2024 are in the form of signals which may be, for example, electronic, electromagnetic, optical, or other signals capable of being received by communications interface 2024. These signals are provided to communications interface 2024 via a communications path (i.e., channel) 2026. This channel 2026 carries signals and is implemented using wire or cable, fiber optics, a phone line, a cellular phone link, an RF link, and/or other communications channels.

Although specific embodiments of the invention have been disclosed, those having ordinary skill in the art will understand that changes can be made to the specific embodiments without departing from the spirit and scope of the invention. The scope of the various embodiments of the present invention is not to be restricted, therefore, to the specific embodiments. Furthermore, it is intended that the appended claims cover any and all such applications, modifications, and embodiments within the scope of the various embodiments of the present invention.

What is claimed is:

1. A computer-implemented method for approximating any results returned by a query over a relational data source, the method comprising:
    receiving, at a computer system, a set of entity types, wherein an entity type in the set of entity types represents a superset of a set of values that is storable in that field;
    receiving, at the computer system, an entity type for each field in a schema, wherein the schema describes a relational data source to be searched;
    producing, at the computer system, at least one approximation of at least one result returned by a query, wherein the query includes calls to other query procedures, and wherein the approximation includes at least one of a set of records of entity types and a set of records of Boolean formulas over entity types, wherein each field in the result occurs as a field in a record of entity types, and each entity type assigned to a field represents a superset of the set of values that are storable in that field; and
    optimizing, at the computer system, by transforming the other query procedures using the approximation by eliminating query parts that return an empty set of results regardless of the contents of the relational data source in a context where the query parts are called.

2. The computer-implemented method of claim 1, further comprising:
    translating the query to relational algebra comprising a set of relational algebra operators, and wherein the approximation is produced by interpreting each relational algebra operator as a corresponding operator on sets of records of entity types.

3. The computer-implemented method of claim 1, wherein the approximation is produced by evaluating the query on an especially constructed database comprising a set of relations, wherein each relation in the especially constructed database is constructed in terms of entity types.

4. The computer-implemented method of claim 1, further comprising:
    adding equality constraints to each record of entity types, wherein the equality constraints that have been added list which fields have equal values in each of the records of entity types, whereby a more precise approximation of sets of records of values is computed based on the equality constraints that have been added.

5. The computer-implemented method of claim 1, wherein the type for each field in a schema is an entity type, and wherein an entity type is a set comprising:
    partial order;
    a meet operator, giving, for any two types t and, their meet $s \wedge t$;
    a bottom type that is a subtype of all types;
    wherein a set of values in the meet of two types is an intersection of the values in those types, and a set of values in the bottom type is empty.

6. The computer-implemented method of claim 5, where the entity type is represented using at least one of:
    a set of classes in an object-oriented class hierarchy, which is downward-closed;
    an expression in a system for knowledge representation, such as a description logic;
    an automaton describing a set of values the type represents.

7. The computer-implemented method of claim 1, wherein the approximation is a set of records of Boolean formulas over types, and
    a set of type facts is given, wherein each type fact is a Boolean formula over types; and
    a subtype order on types is determined by the set of type facts.

8. The computer-implemented method of claim 7, wherein the Boolean formulas over types are represented using at least one of:
    Binary Decision Diagrams (BDDs), and
    a form suitable for processing by at least one of SAT solvers and theorem provers, wherein a SAT solver is a Boolean Satisfiability solver.

9. The computer-implemented method of claim 8, wherein a set of dependencies is deduced from the set of type facts, wherein the set of dependencies is used to determine an order of BDD variables for efficient evaluation.

10. The computer-implemented method of claim 9, wherein the order of BDD variables is determined by placing variables that are mentioned together in a single type fact close together in a variable order.

11. The computer-implemented method of claim 9, further comprising:
    deducing a graph of dependencies between variables from the set of type facts;
    identifying strongly connected components in the graph;
    placing variables in a same strongly connected component close together in variable order; and
    placing at least a first strongly connected component that includes a smaller number of variables before at least a second strongly connected component that includes a larger number of variables in the variable order.

12. The computer-implemented method of claim 9, further comprising:
    deducing a cost metric from the set of type facts; and
    selecting a variable order of minimum cost among multiple alternative variable orders based on the cost metric.

13. The computer-implemented method of claim 7, further comprising:
    representing the approximation as a Boolean formula, wherein each field in a record corresponds to a designated propositional variable, and an assertion that a field has a particular type is represented as an implication that the designated propositional variable implies the Boolean formula that represents the type.

14. The computer-implemented method of claim 13, further comprising:
adding equality constraints to a representation of records of types, and these equality constraints are themselves represented as logical equivalences between the designated propositional variables.

15. The computer-implemented method of claim 13, wherein the approximation is represented as a Boolean formula; and
wherein the Boolean formula for the approximation is represented using at least one of Binary Decision Diagrams (BDDs) and a form suitable for processing by at least one of SAT solvers and theorem provers, wherein a SAT solver is a Boolean Satisfiability solver.

16. The computer-implemented method of claim 15, wherein BDDs are used for representing the approximation as a Boolean formula, and wherein a set of dependencies is deduced from the set of type facts, and wherein the set of dependencies is used to determine an order of BDD variables for efficient evaluation.

17. The computer-implemented method of claim 1, wherein the approximation of the result is produced by at least one of:
recording that one field's values are smaller than another field's values;
modeling constants in the query as new types; and
using formal grammars to model data values and their dependencies.

18. The computer-implemented method of claim 1, wherein data is stored in a plurality of relational data sources including at least one of:
a relational database;
a web service;
a web page; and
a file on a hard disk.

19. The computer-implemented method of claim 1, further comprising:
identifying, based on the approximation, erroneous parts of the query that return an empty set of results regardless of contents stored in the relational data source.

20. The computer-implemented method of claim 19, further comprising:
determining that an empty part of the query includes a conjunction of other parts; and
determining at least one cause of the query being empty based on identifying a smallest set of query parts that have a conjunction that is itself empty.

21. The computer-implemented method of claim 20, further comprising:
searching all parts of the query to identify an empty part of the query;
keeping a stack of approximations of a context where a currently searched part of the query is being used;
pushing, when entering a query part, a conjunction of the approximation of that query part and a context on top of the stack; and
in response to the top of the stack being empty, reporting an error.

22. The computer-implemented method of claim 19, further comprising:
warning a user of the query, based on the identifying, that the query is associated with an empty query part, wherein the warning identifies at least one cause of the empty query part.

23. The computer-implemented of claim 19, further comprising:
visually identifying to a user of the query how a set of queries can be combined by conjunction without creating empty parts in a combined query.

24. The computer-implemented method of claim 23, wherein the visually identifying comprises depicting compatible types with similar pictures in a user interface.

25. The computer-implemented method of claim 1, wherein the context of the query procedure in the query is computed by:
traversing a call graph of that query;
keeping a stack of approximations of a context where the query procedure is being used; and
in response to entering a procedure in the call graph, pushing a conjunction of an approximation of a body of that procedure and a top of the stack onto the stack as a new context.

26. The computer-implemented method of claim 1, wherein the query parts that return an empty set are eliminated to achieve virtual method resolution in an object-oriented query language.

27. The computer-implemented of claim 1, further comprising:
optimizing, based on the approximation, queries by eliminating type tests, wherein a type test is a query part that tests whether a value has a given type, and wherein the approximation shows one of
the value having the type regardless of contents stored in the relational data source, and
the value failing to have the type.

28. The computer-implemented method of claim 27, further comprising:
determining that a part of the query is a type test by checking that the query's approximation is exact.

29. The computer-implemented of claim 28, wherein checking that the approximation of the result returned by the query is exact further comprises:
checking that the query includes only projections to fields that have been marked in a schema of the relational data source as coinciding with the fields' declared type, and does not include any selections and negations.

30. A system for approximating the result returned by a query over a relational data source, the system comprising:
a memory;
a processor communicatively coupled to the memory; and
a compiler communicatively coupled to the memory and the processor, wherein the compiler is adapted to:
receive, at a computer system, a set of entity types, wherein an entity type in the set of entity types represents a superset of a set of values that is storable in that field;
receive, at the computer system, an entity type for each field in a schema, wherein the schema describes a relational data source to be searched;
produce, at the computer system, at least one approximation of at least one result returned by a query, wherein the query includes calls to other query procedures, and wherein the approximation includes at least one of a set of records of entity types and a set of records of Boolean formulas over entity types, wherein each field in the result occurs as a field in a record of entity types, and each entity type assigned to a field represents a superset of the set of values that are storable in that field; and
optimize, at the computer system, by transforming the other query procedures using the approximation by eliminating query parts that return an empty set of results regardless of the contents of the relational data source in a context where the query parts are called.

31. A non-transitory computer program product for approximating the result returned by a query over a relational data source, the computer program product comprising instructions for:

receiving, at a computer system, a set of entity types, wherein an entity type in the set of entity types represents a superset of a set of values that is storable in that field;

receiving, at the computer system, an entity type for each field in a schema, wherein the schema describes a relational data source to be searched;

producing, at the computer system, at least one approximation of at least one result returned by a query, wherein the query includes calls to other query procedures, and wherein the approximation includes at least one of a set of records of entity types and a set of records of Boolean formulas over entity types, wherein each field in the result occurs as a field in a record of entity types, and each entity type assigned to a field represents a superset of the set of values that are storable in that field; and optimizing, at the computer system, by transforming the other query procedures using the approximation by eliminating query parts that return an empty set of results regardless of the contents of the relational data source in a context where the query parts are called.

* * * * *